US009651796B2

United States Patent
Miyasako

(10) Patent No.: US 9,651,796 B2
(45) Date of Patent: May 16, 2017

(54) IMAGE SHAKE CORRECTING APPARATUS AND ITS CONTROL METHOD

(71) Applicant: CANON KABUSHIKI KAISHA, Tokyo (JP)

(72) Inventor: Kenichi Miyasako, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 14/591,386

(22) Filed: Jan. 7, 2015

(65) Prior Publication Data

US 2015/0198818 A1 Jul. 16, 2015

(30) Foreign Application Priority Data

Jan. 16, 2014 (JP) .................................. 2014-006224

(51) Int. Cl.
G02B 27/64 (2006.01)
H04N 5/232 (2006.01)

(52) U.S. Cl.
CPC ....... *G02B 27/646* (2013.01); *H04N 5/23258* (2013.01); *H04N 5/23296* (2013.01)

(58) Field of Classification Search
CPC ............. G02B 27/646; H04N 5/23258; H04N 5/23296
USPC ....................................................... 359/557
See application file for complete search history.

(56) References Cited

U.S. PATENT DOCUMENTS

| 7,917,022 B2 | 3/2011 | Lee et al. |
| 8,509,609 B2 | 8/2013 | Wakamatsu |
| 8,681,229 B2 * | 3/2014 | Nomura ................... G03B 5/00 348/208.1 |
| 9,197,817 B2 | 11/2015 | Miyahara |

(Continued)

FOREIGN PATENT DOCUMENTS

| CN | 101551267 A | 10/2009 |
| CN | 102377941 A | 3/2012 |

(Continued)

OTHER PUBLICATIONS

Feb. 14, 2017 Chinese Office Action, a copy of which is enclosed with an English Translation, that issued in Chinese Patent Application No. 201510024088.5.

*Primary Examiner* — Bumsuk Won
*Assistant Examiner* — Grant Gagnon
(74) *Attorney, Agent, or Firm* — Cowan, Liebowitz & Latman, P.C.

(57) ABSTRACT

Provided is an image shake correcting apparatus including an angular velocity sensor. A frequency separating unit separates a shake detection signal into a low frequency signal and a high frequency signal by filtering. A first image shake correcting unit performs image shake correction based on one signal of the high frequency signal and the low frequency signal and a second image shake correcting unit performs image shake correction based on the other signal. A frequency separation control unit determines the image shake correcting units to which the low frequency signal and the high frequency signal are respectively applied depending (Continued)

on the zoom position of the optical system of an imaging apparatus. The frequency separation control unit prohibits a change of control of the frequency separating unit during a zoom position change operation but changes control of the frequency separating unit after completion of the zoom position change operation.

10 Claims, 15 Drawing Sheets

(56) References Cited

U.S. PATENT DOCUMENTS

2005/0254805 A1* 11/2005 Moriya .............. H04N 5/23287
 396/53
2008/0037970 A1* 2/2008 Saito ........................ G03B 5/00
 396/55

FOREIGN PATENT DOCUMENTS

| CN | 102917168 A | 2/2013 |
|----|-------------|--------|
| JP | 2008064847 A | 3/2008 |
| JP | 4518197 B | 8/2010 |
| JP | 2013160812 A | 8/2013 |

* cited by examiner

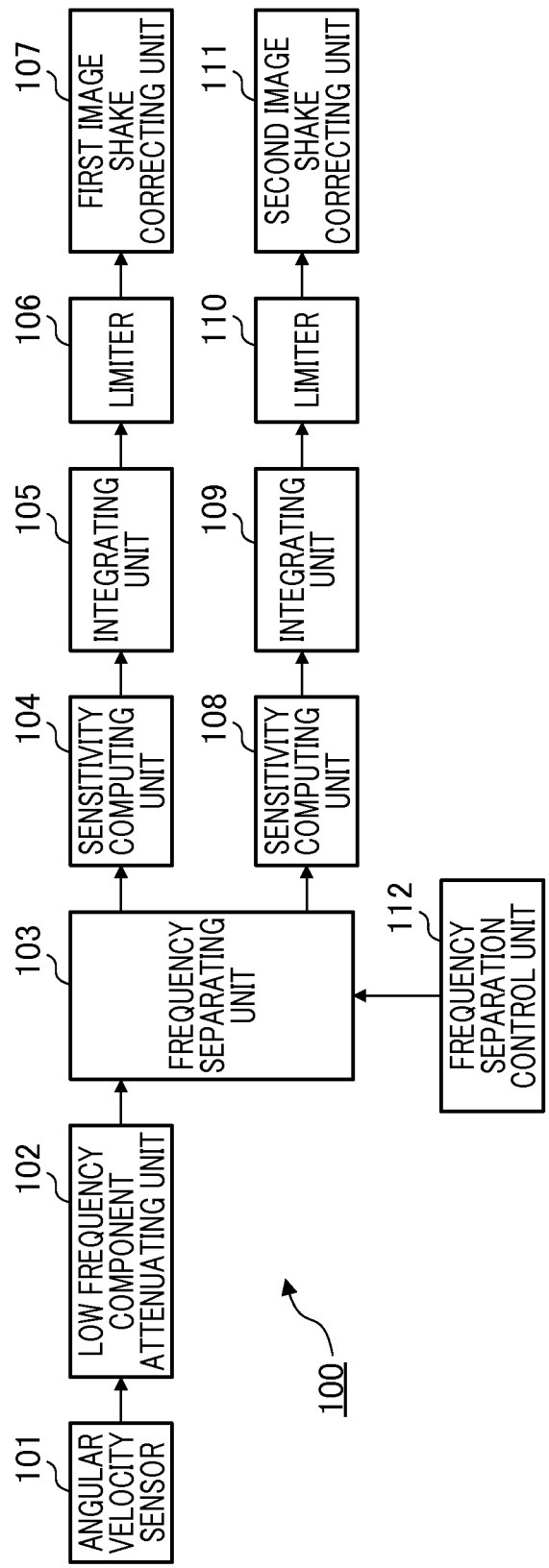

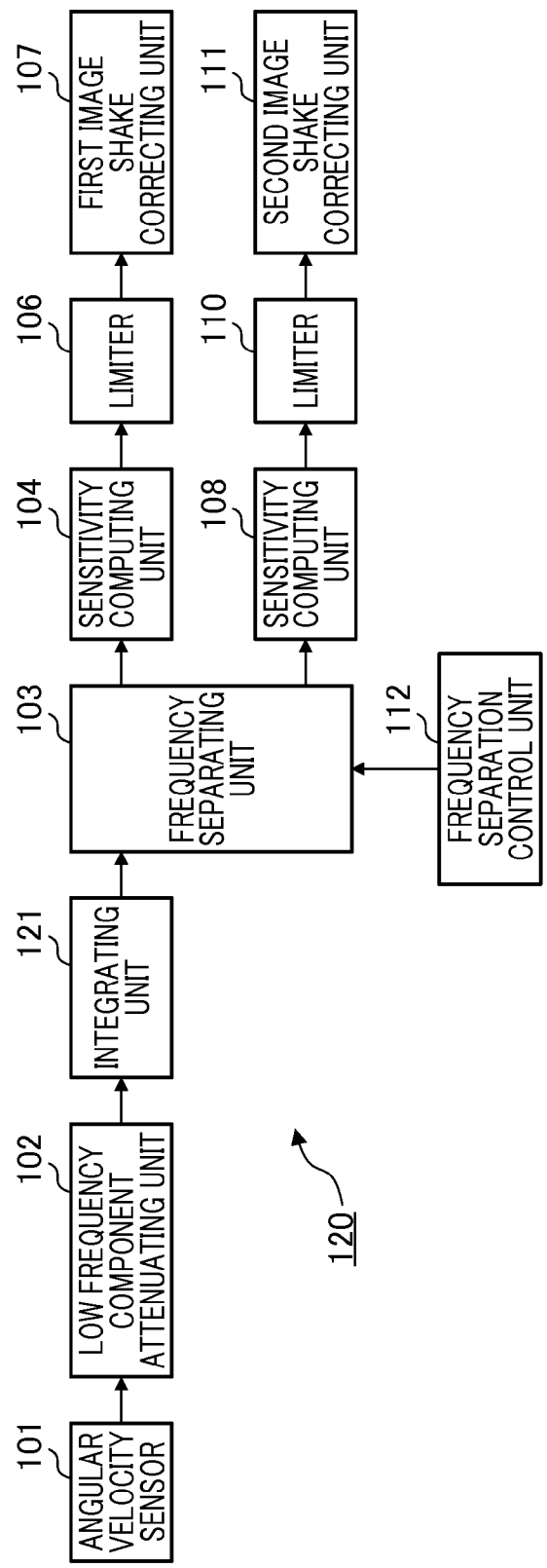

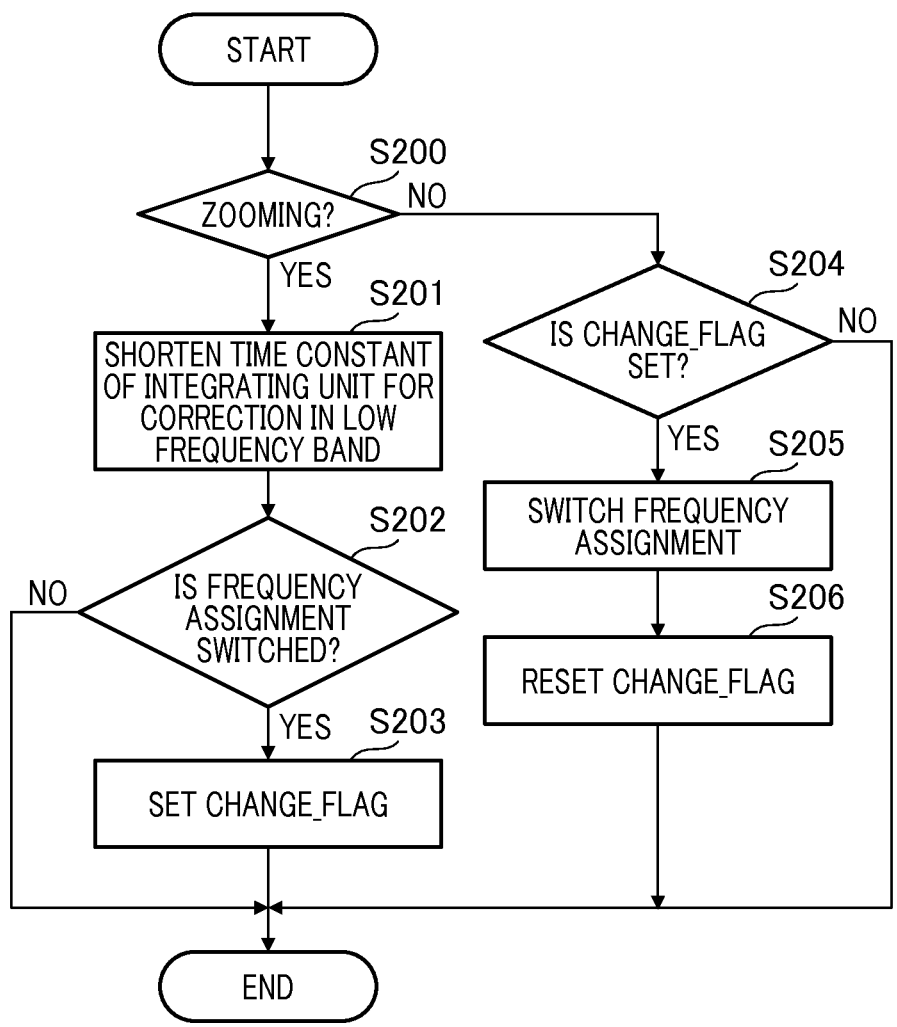

OUTPUT OF INTEGRATING UNIT 105

OUTPUT OF INTEGRATING UNIT 109

OUTPUT OF INTEGRATING UNIT 105

OUTPUT OF INTEGRATING UNIT 109

IMAGE SHAKE CORRECTING APPARATUS AND ITS CONTROL METHOD

BACKGROUND OF THE INVENTION

Field of the Invention

The present invention relates to a technique for correcting image shake using a plurality of image shake correcting units.

Description of the Related Art

In recent years, along with a decrease in size of an imaging apparatus and an increase in magnification of an optical system, a shake of an imaging apparatus or the like becomes a large factor which reduces the quality of a shot image. In this regard, various image shake correction functions of correcting image shake of a captured image caused by a shake of an apparatus or the like are proposed. Japanese Patent No. 4518197 discloses a control method using a plurality of shake correcting units in combination as a shake correction function mounted in an imaging apparatus. An angular velocity sensor signal is separated into a low frequency band and a high frequency band so as to perform image shake correction of an imaging apparatus by means of the shake correcting units.

In the technique disclosed in Japanese Patent No. 4518197, correction in the low frequency band and correction in the high frequency band are fixedly assigned to two shake correcting units. However, in the case of an imaging apparatus including, for example, a zooming optical system, the correctable amounts of two shake correcting units may vary depending on the zooming magnification as shown in FIG. 5. The correctable amount of each shake correcting unit is determined by the light quantity balance, the MTF (Modulation Transfer Function) properties, and the like of an imaging optical system.

Shake applied to an imaging apparatus has properties such that the amplitude increases at lower frequency but decreases at higher frequency. Thus, it is contemplated that, for two shake correcting units, correction in the low frequency band is assigned to one of them having a large correctable amount and correction in the high frequency band is assigned to the other having a small correctable amount. When the relationship in magnitude between the correctable amounts of two shake correcting units varies with a change in zooming magnification as shown in FIG. 5, optimum shake correction control can be performed by changing the assignment of correction in the high frequency band and correction in the low frequency band to two shake correcting units.

SUMMARY OF THE INVENTION

The present invention provides an image shake correcting apparatus that controls a plurality of image shake correcting units by separating a shake detection signal into a low frequency band component and a high frequency band component so as to smoothly switch assignment of correction in the high frequency band and correction in the low frequency band.

According to an aspect of the present invention, an image shake correcting apparatus that corrects image shake using a first image shake correcting unit and a second image shake correcting unit is provided that includes a signal separating unit configured to separate a shake signal detected by a shake detecting unit into a low frequency signal and a high frequency signal; and a control unit configured to perform a switching operation between a first control which corrects image shake by controlling the first image shake correcting unit using a shake correction signal calculated from the low frequency signal and corrects image shake by controlling the second image shake correcting unit using a shake correction signal calculated from the high frequency signal and a second control which corrects image shake by controlling the first image shake correcting unit using the shake correction signal calculated from the high frequency signal and corrects image shake by controlling the second image shake correcting unit using the shake correction signal calculated from the low frequency signal, wherein the control unit performs the first control if the size of the correctable range of the first image shake correcting unit is larger than the size of the correctable range of the second image shake correcting unit but performs the second control if the size of the correctable range of the second image shake correcting unit is larger than the size of the correctable range of the first image shake correcting unit.

Further features of the present invention will become apparent from the following description of exemplary embodiments with reference to the attached drawings.

BRIEF DESCRIPTION OF THE DRAWINGS

FIG. 1 is a block diagram illustrating an example of a configuration of an image shake correcting apparatus according to a first, third, and fourth embodiments of the present invention.

FIG. 7 is a block diagram illustrating an example of a configuration of an image shake correcting apparatus according to second and fifth embodiments of the present invention.

FIGS. 12A and 12B are flowcharts each illustrating processing performed by a frequency separation control unit according to the sixth embodiment of the present invention.

DESCRIPTION OF THE EMBODIMENTS

Figure 2A:
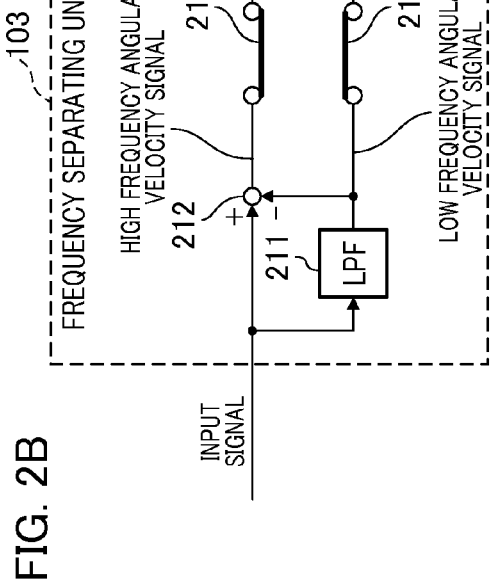
FIGS. 2A to 2D are block diagrams each illustrating an example of a configuration of a frequency separating unit according to first and second embodiments of the present invention.

Hereinafter, preferred embodiments of the present invention will be described with reference to the drawings. The present invention is applicable to an optical instrument such as an interchangeable lens or a lens barrel mounted in a digital single lens reflex camera, an imaging apparatus such as a digital video camera, a monitor camera, or a Web camera, and electronic equipment including an imaging apparatus such as a mobile phone or a tablet terminal. In the following description, a description will be given of image shake correction control of an image in either one of the horizontal direction or the vertical direction (since the same is applied to image shake correction control in other direction, the explanation thereof will be omitted).

(First Embodiment)

A specific description will be given of the components of an image shake correcting apparatus 100 according to a first embodiment of the present invention and the exemplary operation performed thereby with reference to FIG. 1. FIG. 1 is a block diagram illustrating an example of a configuration of the image shake correcting apparatus 100.

An angular velocity sensor 101 detects shake applied to the image shake correcting apparatus 100. An angular velocity signal which is a shake detection signal is fed to a low frequency component attenuating unit 102. The low frequency component attenuating unit 102 attenuates a low frequency component contained in the angular velocity signal from the angular velocity sensor 101 to output a high frequency band signal. For example, an HPF (high-pass filter) is used for attenuating a low frequency component. A frequency separating unit 103 for performing signal separation acquires the output of the low frequency component attenuating unit 102 and further separates it into a high frequency angular velocity signal and a low frequency angular velocity signal. The separated signals are sent to sensitivity computing units 104 and 108, respectively. An example of a configuration of the frequency separating unit 103 is shown in FIG. 2.

In the example shown in FIG. 2A, the input signal to the frequency separating unit 103 is processed by an HPF (high-pass filter) 201 and a subtraction unit 202. An output obtained after the input signal is passed through the HPF 201 becomes a high frequency angular velocity signal. The subtraction unit 202 also subtracts the output of the HPF 201 from the input signal, and the resulting subtracted output becomes a low frequency angular velocity signal. Switches 203 and 204 constitute an output signal switching unit. The switch 203 is provided at the output stage of the HPF 201, and the switch 204 is provided at the output stage of the subtraction unit 202. For a signal Out1_1 fed to the sensitivity computing unit 104 and a signal Out1_2 fed to the sensitivity computing unit 108, the switches 203 and 204 have a role to select which of a high frequency angular velocity signal and a low frequency angular velocity signal is to be fed. In FIG. 2A, the signal Out1_1 is a high frequency angular velocity signal and the signal Out1_2 is a low frequency angular velocity signal. Such switching control is performed in accordance with an instruction given by a control signal from a frequency separation control unit 112 to be described below.

Figure 2B:
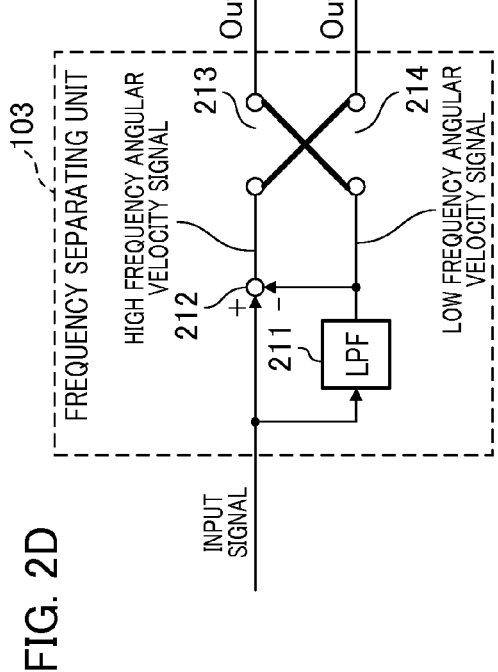

In the example shown in FIG. 2B, the input signal to the frequency separating unit 103 is processed by an LPF (low-pass filter) 211 and a subtraction unit 212. An output obtained after the input signal is passed through the LPF 211 becomes a low frequency angular velocity signal. The subtraction unit 212 also subtracts the output of the LPF 211 from the input signal, and the resulting subtracted output becomes a high frequency angular velocity signal. Switches 213 and 214 constitute an output signal switching unit. The switch 213 is provided at the output stage of the subtraction unit 212, and the switch 214 is provided at the output stage of the LPF 211. For a signal Out2_1 fed to the sensitivity computing unit 104 and a signal Out2_2 fed to the sensitivity computing unit 108, the switches 213 and 214 have a role to select which of a high frequency angular velocity signal and a low frequency angular velocity signal is to be fed. In FIG. 2B, the signal Out2_1 is a high frequency angular velocity signal and the signal Out2_2 is a low frequency angular velocity signal.

Figure 2C:
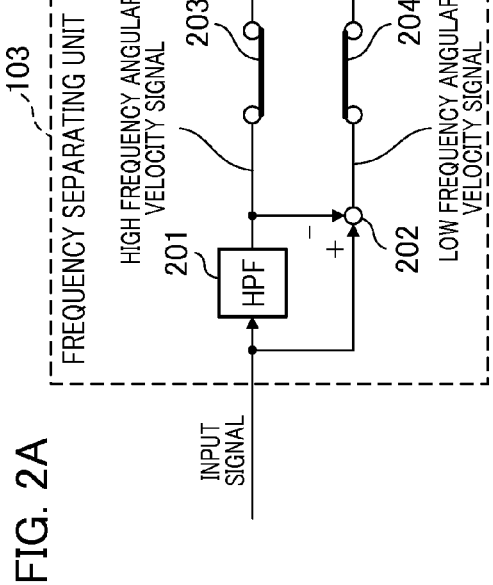
Figure 2D:
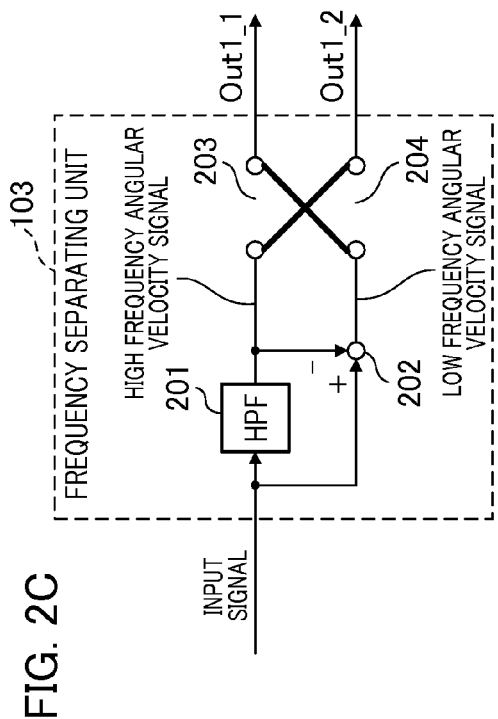

In contrast to FIG. 2A, FIG. 2C shows an example in which the connection state of the switch 203 and the switch 204 is changed such that the signal Out1_1 becomes a low frequency angular velocity signal and the signal Out1_2 becomes a high frequency angular velocity signal. Likewise, in contrast to FIG. 2B, FIG. 2D shows an example in which the connection state of the switch 213 and the switch 214 is changed such that the signal Out2_1 becomes a low frequency angular velocity signal and the signal Out2_2 becomes a high frequency angular velocity signal. Such switching control is performed in accordance with an instruction given by a control signal from the frequency separation control unit 112 to be described below.

Figure 3:
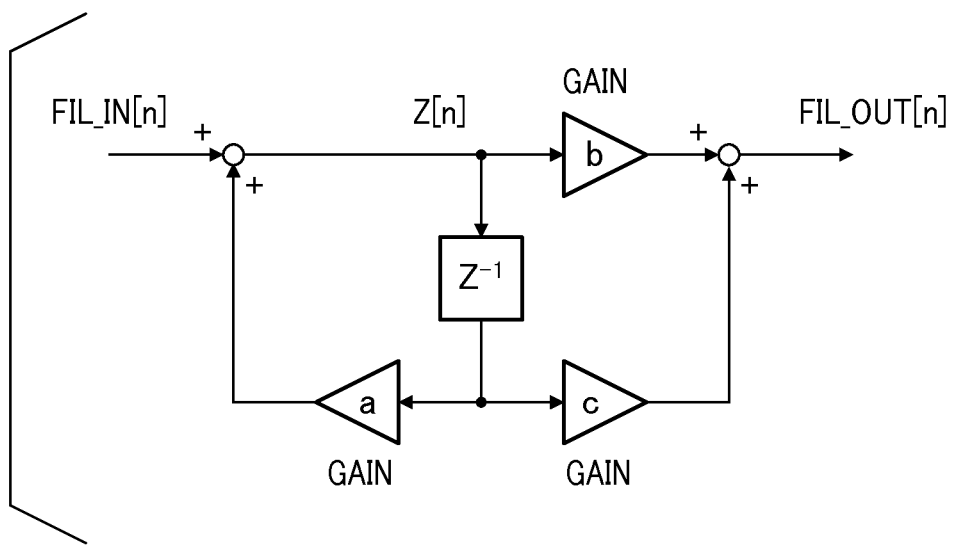
FIG. 3 is a block diagram illustrating an example of a configuration of the internal filter of a frequency separating unit.

The HPF 201 or the LPF 211 shown in FIGS. 2A to 2D is a digital filter and has a configuration of a typical recursive digital filter (IIR filter) shown in FIG. 3. The gain units a, b, and c multiply the respective input signals by the coefficients a, b, and c, respectively, to output the resulting signals. In the case of the HPF 201, the coefficients a and b are positive values and the coefficient c is a negative value. In the case of the LPF 211, the coefficients a, b, and c are positive values. A $Z^{-1}$ (delay element) outputs an input signal by delaying it by 1 sampling time. In the HPF 201 or the LPF 211, an input signal in the nth sampling is defined as FIL_IN[n], an output signal is defined as FIL_OUT[n], and a signal (hereinafter referred to as "filter intermediate value") to be fed to $Z^{-1}$ is defined as Z[n]. The calculation values of FIL_OUT[n] and Z[n] are as follows:

$$FIL\_OUT[n] = b \cdot Z[n] + c \cdot Z[n-1] \quad \text{(Formula 1)}$$

$$Z[n] = FIL\_IN[n] + a \cdot Z[n-1] \quad \text{(Formula 2)}$$

Computation of (Formula 1) and (Formula 2) is repeated, so that the HPF 201 outputs an input signal to the frequency separating unit 103 by attenuating a low frequency band signal and the LPF 211 outputs an input signal to the frequency separating unit 103 by attenuating a high frequency band signal. While, in the present embodiment, a description will be given by using a primary IIR filter having one delay element for ease of explanation, a high-order filter having two or more delay elements may also be used.

The sensitivity computing unit 104, an integrating unit 105, and a limiter 106 shown in FIG. 1 constitute a first calculation block for computing a first image shake correction amount (first correction amount) based on a high frequency angular velocity signal or a low frequency angular velocity signal acquired from the frequency separating unit 103. In the present embodiment, first calculation processing for calculating a first correction amount from one signal of a low frequency angular velocity signal and a high frequency angular velocity signal and second calculation processing for calculating a second correction amount from the other signal to be described below are executed. The signal of the first image shake correction amount is output to a first image shake correcting unit 107. The sensitivity computing unit 104 computes sensitivity for correcting shake detected by the angular velocity sensor 101. The sensitivity is a coefficient indicating how much the first image shake correcting unit 107 is driven, and the result obtained by multiplying the coefficient by an angular velocity signal is output to the integrating unit 105. The integrating unit 105 integrates the output from the sensitivity computing unit 104 to calculate the correction amount of the first image shake correcting unit 107. The limiter 106 limits the output of the integrating unit 105 such that the first image shake correcting unit 107 is driven within the correctable range. The output of the limiter 106 is output as the signal of the first image shake correction amount to the first image shake correcting unit 107.

On the other hand, the sensitivity computing unit 108, the integrating unit 109, and the limiter 110 constitute a second calculation block for computing a second image shake correction amount (second correction amount) based on a low frequency angular velocity signal or a high frequency angular velocity signal acquired from the frequency separating unit 103. The signal of the second image shake correction amount is output to a second image shake correcting unit 111. Since the components 108 to 110 are the same as the components 104 to 106 except that a frequency band to the sensitivity computing unit 108 is different and the output destination of the limiter 110 is the second image shake correcting unit 111, an explanation thereof will be omitted.

Figure 4A:
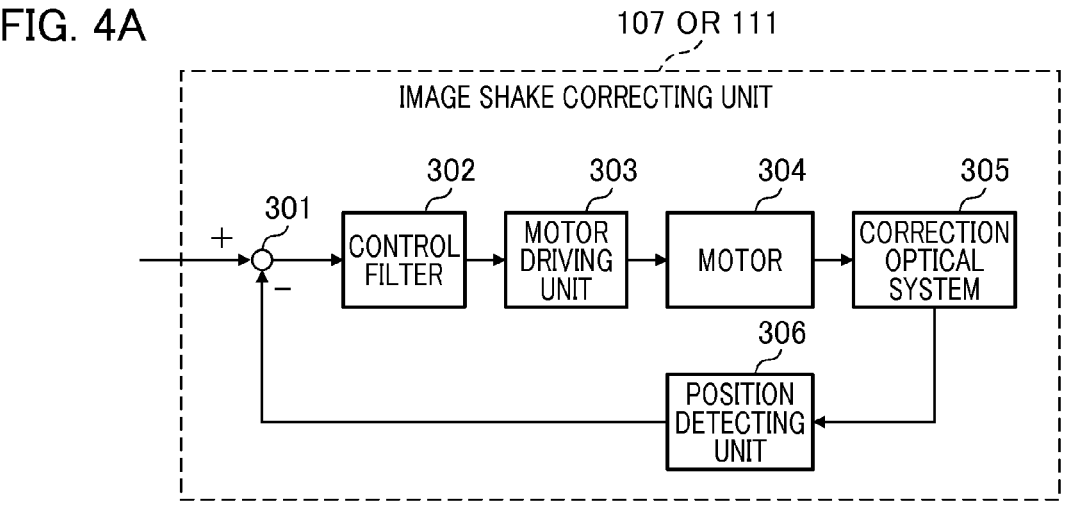
FIGS. 4A to 4C are block diagrams each illustrating an example of a configuration of first and second image shake correcting units.
Figure 4B:
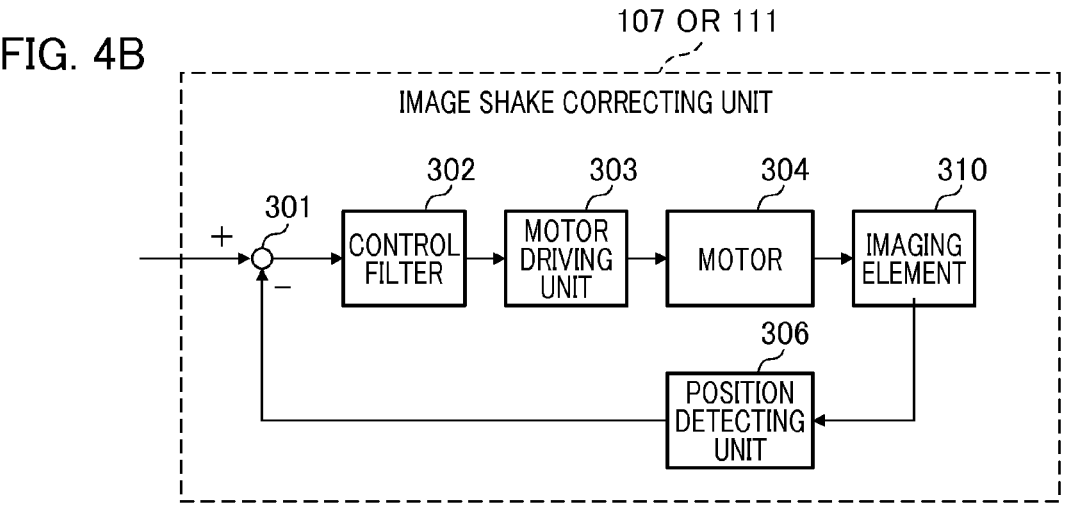
Figure 4C:
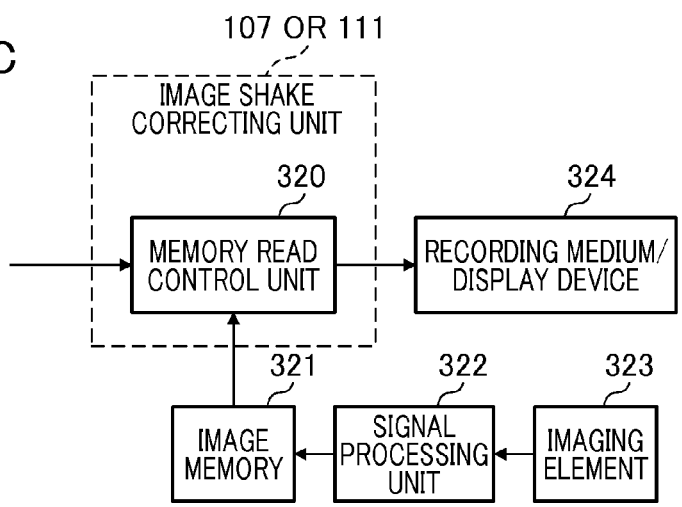

FIGS. 4A to 4C illustrate the configuration of the first image shake correcting unit 107 and the second image shake correcting unit 111.

FIG. 4A shows an exemplary configuration when the movable optical member (correction lens or the like) of the correction optical system 305 is shifted in a direction perpendicular to the optical axis or is rotated about any point on the optical axis to thereby perform image shake correction. A subtraction unit 301 subtracts the output of the position detecting unit 306 for detecting the position of the correction optical system 305 from an input signal (image shake correction amount signal). The deviation data which is the subtraction result (difference) is fed to a control filter 302. The control filter 302 is constituted by an amplification unit configured to amplify input data with a predetermined gain and a phase compensation filter. The deviation data from the subtraction unit 301 is subject to amplification and phase compensation processing by the control filter 302 and then is output to a motor driving unit 303. A motor 304 connected to the motor driving unit 303 is a voice coil motor for driving a correction optical system 305. The movable optical member of the correction optical system 305 is moved by the driving of the motor 304. A position detecting unit 306 includes a magnet and a hole sensor provided at a position opposite thereto and detects the movement amount of the movable optical member of the correction optical system 305. A signal indicating the detection result is output to the subtraction unit 301. In this manner, a feedback control system is configured to follow the movement amount regarding the correction optical system 305 to an input signal. The correction optical system 305 is a correction system that is optically capable of correcting image shake by deflecting the orientation of the optical axis depending on the movement amount of the movable optical member. A correction lens or the like is driven in accordance with the output of the limiter 106 (or the limiter 110) so that image shake correction can be achieved.

FIG. 4B shows an exemplary configuration of an image shake correcting unit when an imaging element 310 shifts in a direction perpendicular to the optical axis. The difference from FIG. 4A lies in that the drive target for image shake correction is changed from the correction optical system 305 to the imaging element 310. Thus, the explanation of the same components as those in FIG. 4A will be omitted. FIG. 4C shows an exemplary configuration of an image shake correcting unit when the image shake is electronically corrected. An image memory 321, a signal processing unit 322, an imaging element 323, and a recording medium/display device 324 shown in FIG. 4C are provided in an imaging apparatus mounting the image shake correcting apparatus 100. The imaging element 323 converts an object image focused by the imaging optical system of the imaging apparatus into a captured image signal and then feeds it to the signal processing unit 322. The signal processing unit 322 generates a video signal complying to the NTSC (National Television System Committee) format or the like based on the signal acquired from the imaging element 323 and stores the video signal in the image memory 321. A memory read control unit 320 changes the reading position of an image from the image memory 321 in accordance with the image shake correction amount (first correction amount or second correction amount) output from the limiter 106 (or the limiter 110). In this manner, a video signal in which image shake is electronically corrected is output from the image memory 321. The memory read control unit 320 further outputs a video signal to the recording medium/display device 324. In other words, an image subjected to image shake correction is displayed on the screen of a display device or image data subjected to image shake correction is recorded in a recording medium. Note that the display device is a device such as a liquid crystal display element (LCD) or the like for displaying an image and the recording medium is an information recording medium such as a magnetic recording medium like a hard disk, a semiconductor memory, or the like.

The assignment of the first image shake correcting unit 107 and the second image shake correcting unit 111 can be changed to any one of FIGS. 4A to 4C. For example, the first image shake correcting unit 107 has a configuration shown in FIG. 4A and the second image shake correcting unit 111 has a configuration shown in FIG. 4B or 4C. When there are two types of correction optical systems in the imaging optical system, both the first image shake correcting unit 107 and the second image shake correcting unit 111 may have a configuration shown in FIG. 4A.

Figure 5:
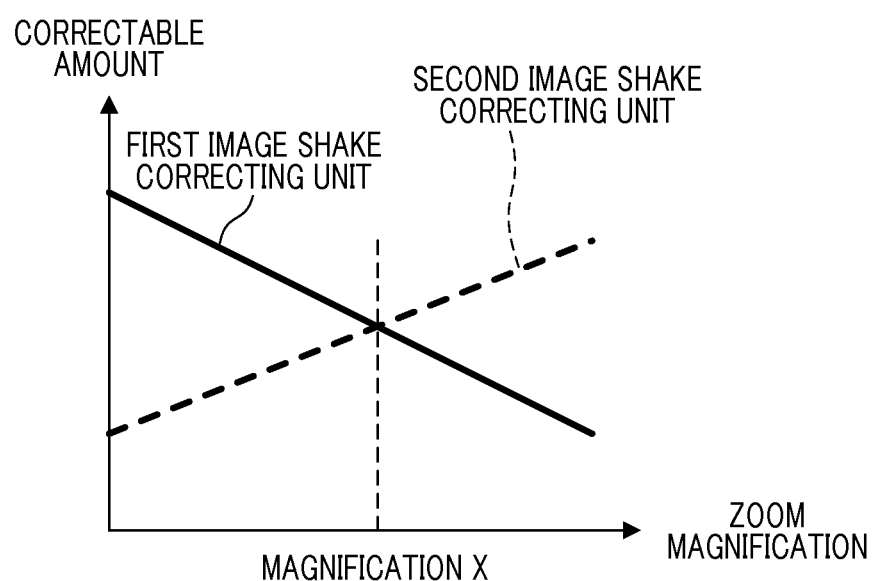
FIG. 5 is a graph illustrating an example of the change in correctable amounts of first and second image shake correcting units depending on a zooming magnification.

Next, a description will be given of the frequency separation control unit 112 shown in FIG. 1. The frequency separation control unit 112 changes the control state of the frequency separating unit 103 based on zoom positional information or the like of an imaging apparatus mounting the image shake correcting apparatus 100. FIG. 5 is a graph illustrating the correctable amount (solid line) of the first image shake correcting unit 107 and the correctable amount (dotted line) of the second image shake correcting unit 111, where the zooming magnification of an imaging optical system in an imaging apparatus mounting the image shake correcting apparatus 100 is plotted on the horizontal axis and the correctable amount is plotted on the vertical axis. As described above, shake applied to an imaging apparatus has properties such that the amplitude increases at lower frequency but decreases at higher frequency. Thus, for two image shake correcting units, correction in the low frequency band is assigned to one of them having a large correctable amount and correction in the high frequency band is assigned to the other having a small correctable amount, so that the correctable amount can be effectively used. Hereinafter, control for outputting a first correction amount calculated from a high frequency signal to the first image shake correcting unit 107 and for outputting a second correction amount calculated from a low frequency signal to the second image shake correcting unit 111 is referred to as "first control". In contrast, control for outputting a first correction amount calculated from a low frequency signal to the first image shake correcting unit 107 and for outputting a second correction amount calculated from a high frequency signal to the second image shake correcting unit 111 is referred to as "second control". Note that first control and second control are changed depending on whether or not a variable value indicating optical information, image taking conditions, and the like of an imaging optical system is equal to or greater than a preset threshold value or less than a threshold value.

For example, the frequency separation control unit 112 performs the following control by comparing the zooming magnification of the imaging optical system with the magnification X (threshold value) shown in FIG. 5.

(1) If the zooming magnification is less than X: to change the operation of the frequency separating unit 103 such that image shake correction in a low frequency band is performed by the first image shake correcting unit 107.

(2) If the zooming magnification is equal to or greater than X: to change the operation of the frequency separating unit 103 such that image shake correction in a high frequency band is performed by the first image shake correcting unit 107.

For the second image shake correcting unit 111, the frequency separation control unit 112 performs the following control by comparing the zooming magnification of the imaging optical system with the magnification X shown in FIG. 5.

(3) If the zooming magnification is less than X: to change the operation of the frequency separating unit 103 such that image shake correction in a high frequency band is performed by the second image shake correcting unit 111.

(4) If the zooming magnification is equal to or greater than X: to change the operation of the frequency separating unit 103 such that image shake correction in a low frequency band is performed by the second image shake correcting unit 111.

More specifically, in the case of (1), the frequency separation control unit 112 controls the frequency separating unit 103 to be in the state shown in FIG. 2C or FIG. 2D. In the case of (2), the frequency separation control unit 112 controls the frequency separating unit 103 to be in the state shown in FIG. 2A or FIG. 2B.

Here, the following problem may occur when image shake correction in a high frequency band and image shake correction in a low frequency band are switched between the first image shake correcting unit 107 and the second image shake correcting unit 111.

FIG. 6 is a graph illustrating a temporal change of an input signal to a sensitivity computing unit, where time is plotted on the horizontal axis. FIG. 6A shows a temporal change of the signal Out1_1 or Out2_1 shown in FIGS. 2A to 2D, i.e., an input signal to the sensitivity computing unit 104. FIG. 6B shows a temporal change of the signal Out1_2 or Out2_2 shown in FIGS. 2A to 2D, i.e., an input signal to the sensitivity computing unit 108. In FIGS. 6A and 6B, the frequency separating unit 103 is in the state shown in FIGS. 2C and 2D in the period from time 0 to time T10. In this case, the signal Out1_1 or Out2_1 is a low frequency angular velocity signal and the signal Out1_2 or Out2_2 is a high frequency angular velocity signal. The graphs in solid lines depict the variation of signals when switching between a high frequency signal and a low frequency signal is performed by the frequency separation control unit 112 at time T10. The graphs shown in dotted lines show the variation of signals when no switching between the signals is performed.

The signal Out1_1 or Out2_1 is integrated by the integrating unit 105 and then is fed to the first image shake correcting unit 107 as a drive target position. In other words, the signal Out1_1 or Out2_1 prior to integration depicts the speed (drive speed) relating to the drive target position of the first image shake correcting unit 107. Likewise, the signal Out1_2 or Out2_2 depicts the speed (drive speed) relating to the drive target position of the second image shake correcting unit 111. As shown by graphs in solid lines in FIGS. 6A and 6B, the magnitude of the signal changes abruptly at time T10. In this manner, the drive speed relating to the first image shake correcting unit 107 and the second image shake correcting unit 111 largely changes. Thus, when the first image shake correcting unit 107 and the second image shake correcting unit 111 do not follow a change in drive speed, a phenomenon may occur such that a shot image is adversely affected by the following error at the time.

In order to avoid such a phenomenon, the frequency separation control unit 112 performs control such that a high frequency angular velocity signal and a low frequency angular velocity signal after switching continuously change upon switching therebetween. Such control is performed on the signals Out1_1, Out1_2, Out2_1, and Out2_2. More specifically, the processing for rewriting the filter intermediate value of the HPF 201 or the LPF 211 is performed. For example, when switching is performed from the state shown in FIG. 2C to the state shown in FIG. 2A, the output of the HPF 201 before the switching is output as the signal Out1_2 and the output of the HPF 201 after the switching is output as the signal Out1_1. Thus, the frequency separation control unit 112 performs control such that the signal immediately before the switching substantially matches the output of the HPF 201 after the switching. The output of the signal Out1_1 immediately before the switching is defined as "MID1" shown in FIG. 6A. The processing for rewriting the filter intermediate value in accordance with the following formula is performed such that the output of the HPF 201 after the switching changes from MID1.

$$Z[n-1]=(MID1-b \cdot FIL\_IN[n-1])/(a \cdot b+c) \quad \text{(Formula 3)}$$

At this time, when the (Formula 3) is substituted in the (Formula 2), the following formula is obtained:

$$Z[n]=FIL\_IN[n]+a \cdot (MID1-b \cdot FIL\_IN[n-1])/(a \cdot b+c) \quad \text{(Formula 4)}$$

Also, when the (Formula 3) and (Formula 4) are substituted in the (Formula 1), the following formula is obtained:

$$FIL\_OUT[n]=MID1+b \cdot (FIL\_IN[n]-FIL\_IN[n-1]) \quad \text{(Formula 5)}$$

The output of the HPF 201 which is the left member of the (Formula 5) is the sum of MID1 and a numerical value obtained by multiplying the change (a difference between input signals) of an input signal to the frequency separating unit 103 in 1 sampling period by the coefficient b. The sampling frequency to be subject to filter computation is set to be a value sufficiently smaller than the shake frequency to be applied to the image shake correcting apparatus 100. Thus, the difference between input signals is reduced, so that the signal Out1_1 becomes a continuous signal before and after the switching. Likewise, the signal Out1_2 is a signal obtained by subtracting the output of the HPF 201 from an input signal to the frequency separating unit 103, and thus, becomes a continuous signal before and after the switching.

When switching is performed from the state shown in FIG. 2D to the state shown in FIG. 2B, the output of the LPF 211 before the switching is output as the signal Out2_1 and the output of the LPF 211 after the switching is output as the signal Out2_2. Thus, the frequency separation control unit 112 performs control such that the signal immediately before the switching substantially matches the output of the LPF 211 after the switching. More specifically, the signal Out2_2 immediately before the switching is defined as "MID2" shown in FIG. 6B. The processing for rewriting the filter intermediate value in accordance with the following formula is performed such that the output of the LPF 211 after the switching changes from MID2.

$$Z[n-1]=(MID2-b \cdot FIL\_IN[n-1])/(a \cdot b+c) \quad \text{(Formula 6)}$$

At this time, when similar calculations to those in the (Formula 4) and (Formula 5) are performed, the following formula is obtained.

$$FIL\_OUT[n]=MID2+b \cdot (FIL\_IN[n]-FIL\_IN[n-1]) \quad \text{(Formula 7)}$$

The output of the LPF 211 which is the left member of the (Formula 7) is the sum of MID2 and a numerical value obtained by multiplying the difference between input signals to the frequency separating unit 103 by the coefficient b and the signal Out2_2 becomes a continuous signal before and after the switching. Likewise, the signal Out2_2 is a signal obtained by subtracting the output of the HPF 201 from an input signal to the frequency separating unit 103, and thus, becomes a continuous signal before and after the switching.

Figure 6A:
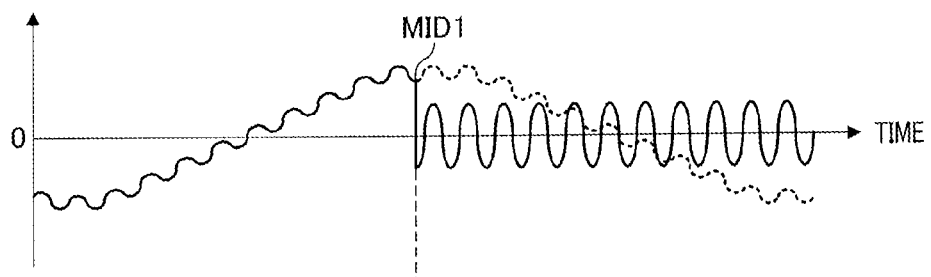
FIGS. 6A to 6D are graphs each illustrating the effect of control executed by a frequency separation control unit according to first to third and fifth embodiments of the present invention.
Figure 6B:
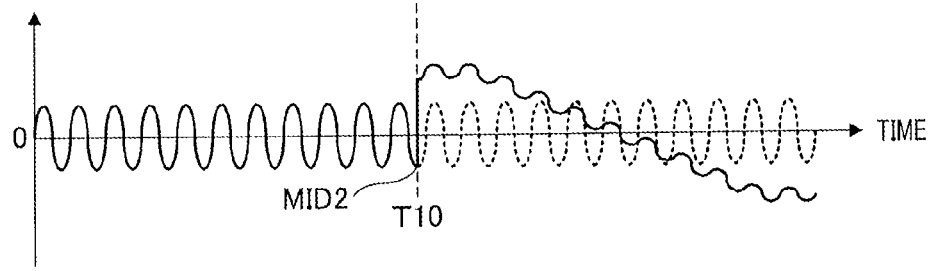
Figure 6C:
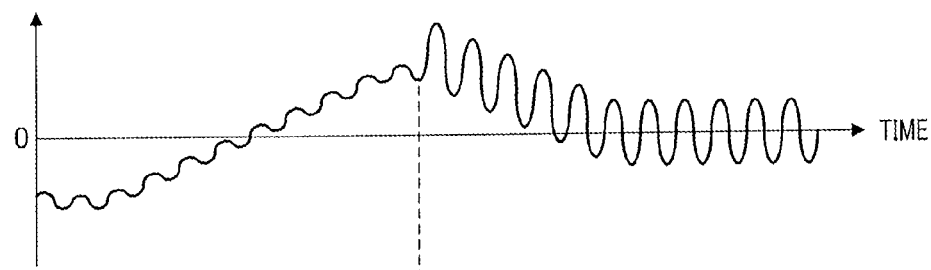
Figure 6D:
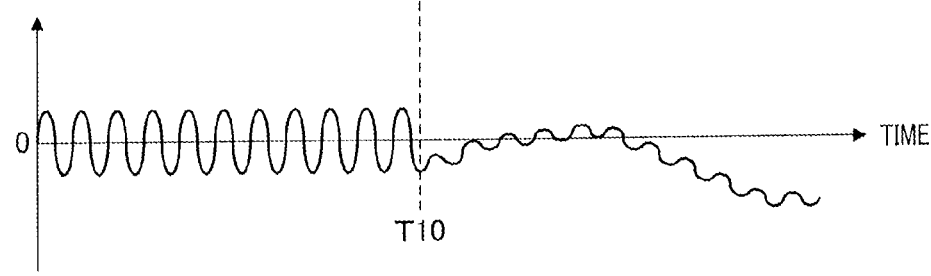

FIG. 6C is a graph illustrating a temporal change of the signal Out1_1 or Out2_1 upon rewriting the filter intermediate value. FIG. 6D is a graph illustrating a temporal change of the signal Out1_2 or Out2_2 upon rewriting the filter intermediate value. A discontinuity caused by an abrupt change in signal level at time T10 shown in FIGS. 6A and 6B does not occur in FIGS. 6C and 6D, so that signals are smoothly interconnected before and after the switching. After switching between a high frequency angular velocity signal and a low frequency angular velocity signal at time T10, a signal level gradually changes in accordance with the time constant of the HPF 201 or the LPF 211, so that the offset component caused by the rewriting of the filter intermediate value is converged. The change in offset component can be adjusted by the time constant of the HPF 201 or the LPF 211. Thus, an abrupt change in drive speed as previously described with reference to graphs in solid lines shown in FIGS. 6A and 6B can be suppressed, so that a phenomenon caused by an adverse effect of the following error of the first image shake correcting unit 107 and the second image shake correcting unit 111 on video can be prevented from being occurred.

In the present embodiment, the output destination of a high frequency angular velocity signal and a low frequency angular velocity signal to the first image shake correcting unit 107 and the second image shake correcting unit 111 can be switched by the frequency separating unit 103. Furthermore, the processing for changing the filter intermediate value of the HPF or LPF provided in the frequency separating unit 103 is performed such that the signals are continuous before and after the switching. In this manner, signals can be smoothly switched upon changing the assignment of correction in the high frequency band and correction in the low frequency band to the first image shake correcting unit 107 and the second image shake correcting unit 111.

According to the present embodiment, a shake detection signal (angular velocity signal) is separated into a low frequency band component and a high frequency band component, and assignment of correction in the high frequency band and correction in the low frequency band is switched, so that optimum image shake correction performance can be realized.

(Second Embodiment)

Next, a description will be given of a second embodiment of the present invention. FIG. 7 is a block diagram illustrating an example of a configuration of an image shake correcting apparatus 120 according to a second embodiment. In the second embodiment, the same components as those shown in FIG. 1 according to the first embodiment are designated by the same reference numerals and explanation thereof will be omitted. A description will be given mainly of the differences from the first embodiment. Such an explanation will be omitted in the same manner in the embodiments to be described below.

The present embodiment is different from the first embodiment in that the integrating unit 121 is provided at the front stage of the frequency separating unit 103 instead of the integrating unit 105 and the integrating unit 109 shown in FIG. 1. The integrating unit 121 integrates a signal from the low frequency component attenuating unit 102 to generate an angle signal to feed it to the frequency separating unit 103. The frequency separating unit 103 separates the angle signal of the integrating unit 121 into a high frequency angle signal and a low frequency angle signal, and then outputs the signals to the sensitivity computing units 104 and 108, respectively.

The configuration of the frequency separating unit 103 is the same as that of the first embodiment except that the high frequency angular velocity signal and the low frequency angular velocity signal shown in FIGS. 2A to 2D are replaced with a high frequency angle signal and a low frequency angle signal, respectively. In order to correct a low frequency angle signal or a high frequency angle signal from the frequency separating unit 103, the sensitivity computing units 104 and 108 multiply the sensitivity of the first image shake correcting unit 107 and the second image shake correcting unit 111, respectively, by an angle signal and feed them to the limiters 106 and 110, respectively. The first image shake correcting unit 107 and the second image shake correcting unit 111 perform an image shake correction operation in accordance with the outputs of the limiters 106 and 110, respectively.

The present embodiment is different from the first embodiment in that an integrating unit for converting speed information into angle information or positional information is provided at the front stage or the rear stage of the frequency separating unit 103. In the first embodiment, a description has been given that, for the discontinuity of signals at time T10 in the graphs in solid lines shown in FIGS. 6A and 6B, the drive speed relating to the first image shake correcting unit 107 and the second image shake correcting unit 111 abruptly changes. In the present embodiment, the sensitivity computing unit 104 and the sensitivity computing unit 108 multiply the output signals Out1_1 and Out1_2 or the output signals Out2_1 and Out2_2 shown in FIGS. 2A to 2D by sensitivity. The results of multiplication are fed to the first image shake correcting unit 107 and the second image shake correcting unit 111 via the limiters 106 and 110, respectively. Thus, when an abrupt change as shown at time T10 occurs in the graphs in solid lines shown in FIGS. 6A and 6B, the first image shake correcting unit 107 and the second image shake correcting unit 111 are stepwisely driven. Consequently, the movement of video upon switching between a high frequency angle signal and a low frequency angle signal cannot be avoided. In particular, when the image shake correcting unit has a configuration such that a movable unit mechanically moves as shown in FIGS. 4A and 4B, a phenomenon may occur such that video continues to move due to ringing not only at the moment of step driving but also for some time after driving.

Accordingly, as in the first embodiment, in the present embodiment, the processing for rewriting the filter intermediate value to be stored in the temporal storage unit provided in the frequency separating unit 103 is performed as shown in (Formula 3) and (Formula 6). In this manner, as shown in FIGS. 6C and 6D, signals can be smoothly interconnected upon switching between a high frequency angle signal and a low frequency angle signal by the frequency separating unit 103. More specifically, a phenomenon of unnatural movement of video can be prevented from being occurred by the stepwise driving of the first image shake correcting unit 107 and the second image shake correcting unit 111.

In the image shake correcting apparatus of the present embodiment, the integrating unit 121 is provided at the front stage of the frequency separating unit 103 to perform processing for separating an angle signal or a position signal into a high frequency component and a low frequency component. When the output destination of a high frequency angle signal and a low frequency angle signal to the first image shake correcting unit 107 and the second image shake correcting unit 111 is switched by the frequency separating unit 103, the filter intermediate value is updated such that the signals are continuous before and after the switching. The term "filter" refers to the HPF or LPF provided in the frequency separating unit 103. According to the present embodiment, signals are smoothly switched upon changing the assignment of correction in the high frequency band and correction in the low frequency band to the first image shake correcting unit 107 and the second image shake correcting unit 111, so that favorable image shake correction performance can be realized.

(Third Embodiment)

Next, a description will be given of a third embodiment of the present invention. The configuration of the image shake correcting apparatus of the present embodiment is the same as that of the first embodiment shown in FIG. 1 except that the internal configuration of the frequency separating unit 103 is as shown in FIG. 8 instead of that shown in FIG. 2.

Figure 8A:
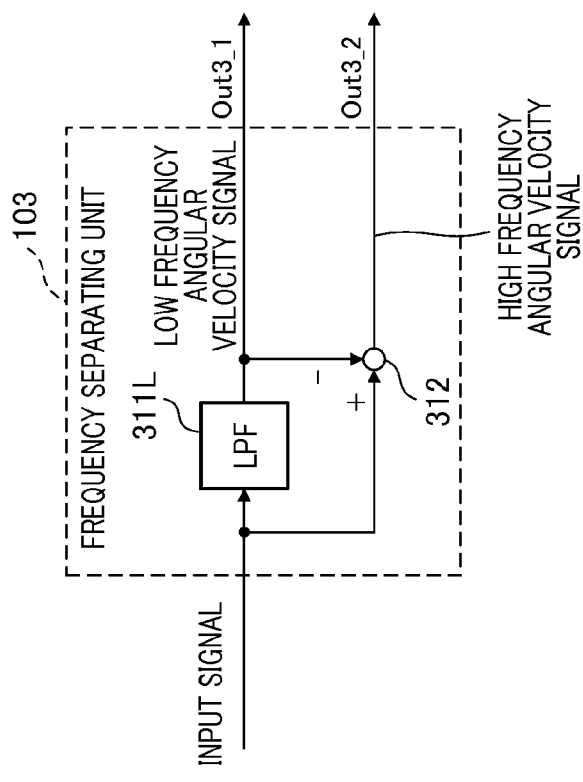
FIGS. 8A and 8B are block diagrams each illustrating an example of a configuration of a frequency separating unit according to the third to fifth embodiments of the present invention.
Figure 8B:
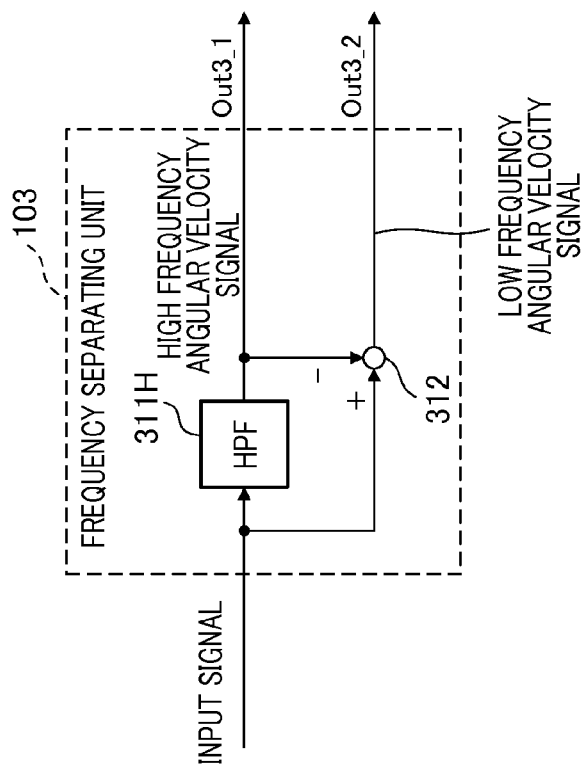

In FIG. 8A, the input signal to the frequency separating unit 103 is processed by an HPF 311H and a subtraction unit 312. An output signal obtained after the input signal is passed through the HPF 311H becomes a high frequency angular velocity signal. An output signal obtained by subtracting the output of the HPF 311H from the input signal by the subtraction unit 312 becomes a low frequency angular velocity signal. In FIG. 8B, the input signal to the frequency separating unit 103 is processed by an LPF 311L and the subtraction unit 312. An output signal obtained after the input signal is passed through the LPF 311L becomes a low frequency angular velocity signal. An output signal obtained by subtracting the output of the LPF 311L from the input signal by the subtraction unit 312 becomes a high frequency angular velocity signal.

In the present embodiment, when correction in the high frequency band and correction in the low frequency band are switched between the first image shake correcting unit 107 and the second image shake correcting unit 111, the frequency separation control unit 112 switches the properties of the internal filter of the frequency separating unit 103 between HPF and LPF. More specifically, the processing for mutually switching between the HPF 311H and the LPF 311L shown in FIG. 8 is executed. In this manner, an output signal Out3_1 to the sensitivity computing unit 104 and an output signal Out3_2 to the sensitivity computing unit 108 can be switched between a high frequency angular velocity signal and a low frequency angular velocity signal.

Each of the HPF 311H and the LPF 311L has a configuration of a typical IIR filter as shown in FIG. 3. Whether the IIR filter is configured as an HPF or is configured as an LPF can be realized by changing the values of the gain coefficients a, b, and c. In other words, in an exemplary configuration shown in FIG. 3, the gain coefficients when the IIR filter is configured as an HPF are a=HPF_a, b=HPF_b, and c=HPF_c, and the gain coefficients when the IIR filter is configured as an LPF are a=LPF_a, b=LPF_b, and c=LPF_c. The mutual conversion between the state of the high-pass filter properties shown in FIG. 8A and the state of the low-pass filter properties shown in FIG. 8B can be performed by mutually switching these gain coefficients.

The following problem as shown in FIGS. 6A and 6B may occur when image shake correction in a high frequency band and image shake correction in a low frequency band are switched between the first image shake correcting unit 107 and the second image shake correcting unit 111 by switching the filter properties between the LPF and the HPF. It should be noted that the following description will be given based on the assumption that "Out1_1 or Out2_1" is replaced with "Out3_1" and "Out1_2 or Out2_2" is replaced with "Out3_2" on the vertical axis shown in FIG. 6. In FIGS. 6A and 6B, the frequency separating unit 103 is in the state shown in FIG. 8B in the period from time 0 to time T10. In other words, the signal Out3_1 is a low frequency angular velocity signal and the signal Out3_2 is a high frequency angular velocity signal. The graphs in solid lines shown in FIGS. 6A and 6B depict the variation of signals when switching between a high frequency angular velocity signal and a low frequency angular velocity signal is performed by the frequency separation control unit 112 at time T10. The graphs shown in dotted lines show the variation of signals when no switching between the signals is performed.

The signal Out3_1 is integrated by the integrating unit 105 and then is fed to the first image shake correcting unit 107 as a drive target position. In other words, the signal Out3_1 prior to integration depicts the drive speed of the first image shake correcting unit 107. Likewise, the signal Out3_2 depicts the drive speed of the second image shake correcting unit 111. In the graph in solid line in FIG. 6A, the magnitude of the signal changes abruptly at time T10 at the instant when the LPF 311L is switched to the HPF 311H. In this manner, the drive speed of the first image shake correcting unit 107 and the second image shake correcting unit 111 largely changes. Thus, when the first image shake correcting unit 107 and the second image shake correcting unit 111 do not follow a change in drive speed, a phenomenon may occur such that a shot image is adversely affected by the following error at the time.

In order to avoid such a phenomenon, the frequency separation control unit 112 performs control for the signals Out3_1 and Out3_2 such that a high frequency angular velocity signal or a low frequency angular velocity signal after switching continuously changes upon switching therebetween. In other words, as in the first embodiment, the processing for rewriting the filter intermediate value of the LPF 311L or the HPF 311H is performed. For example, when switching is performed from the state shown in FIG. 8B to the state shown in FIG. 8A, the filter before the switching has the low-pass filter properties and functions as the LPF 311L but the filter after the switching has the high-pass filter properties and functions as the HPF 311H. Thus, the frequency separation control unit 112 performs control such that the output of the LPF 311L immediately before the switching substantially matches the output of the HPF 311H after the switching. The output of the LPF 311L immediately before the switching is defined as "MID1" shown in FIG. 6A. The processing for rewriting the filter intermediate value in accordance with the following formula is performed such that the output of the HPF 311H after the switching changes from MID1.

$$Z[n-1]=(MID1-HPF\_b \cdot FIL\_IN[n-1])/(HPF\_a \cdot HPF\_b+HPF\_c) \quad \text{(Formula 8)}$$

At this time, when similar calculations to those in the (Formula 4) and (Formula 5) are performed, the following formula is obtained.

$$FIL\_OUT[n]=MID1+HPF\_b \cdot (FIL\_IN[n]-FIL\_IN[n-1]) \quad \text{(Formula 9)}$$

The output of the HPF 311H which is the left member of the (Formula 9) is the sum of MID1 and a numerical value obtained by multiplying the change (a difference between input signals) of an input signal to the frequency separating unit 103 in 1 sampling period by the coefficient HPF_b. The sampling frequency to be subject to filter computation is set to be a value sufficiently smaller than the shake frequency to be applied to the image shake correcting apparatus 100. Thus, the difference between input signals is reduced, so that the signal Out3_1 becomes a continuous signal before and after the switching. Likewise, the signal Out3_2 is a signal obtained by subtracting the output of the HPF 311H from an input signal to the frequency separating unit 103, and thus, becomes a continuous signal before and after the switching.

On the other hand, when switching is performed from the state shown in FIG. 8A to the state shown in FIG. 8B, a continuous signal can be obtained before and after the switching by rewriting the filter intermediate value in accordance with the following formula:

$$Z[n-1]=(MID1-LPF\_b \cdot FIL\_IN[n-1])/(LPF\_a \cdot LPF\_b+LPF\_c) \quad \text{(Formula 10)}$$

Temporal changes of the signals Out3_1 and Out3_2 upon rewriting the filter intermediate value are as shown in graphs of FIGS. 6C and 6D. A discontinuity upon switching from the state in FIG. 8B to the state in FIG. 8A at time T10 does not occur in FIGS. 6C and 6D, so that signals are smoothly interconnected before and after the switching. After switching between a high frequency angular velocity signal and a low frequency angular velocity signal at time T10, a signal level gradually changes in accordance with the time constant of the HPF 311H, so that the offset component caused by the rewriting of the filter intermediate value is converged. The change in offset component can be adjusted by the time constant of the HPF 311H. Thus, as in the above embodiments, a phenomenon caused by an adverse effect of the following error of the first image shake correcting unit 107 and the second image shake correcting unit 111 on video can be prevented from being occurred.

In the third embodiment, switching between a high frequency angular velocity signal and a low frequency angular velocity signal to the first image shake correcting unit 107 and the second image shake correcting unit 111 is performed by changing the filter properties of the frequency separating unit 103. More specifically, mutual switching is performed between the HPF 311H and the LPF 311L. In this manner, switching between a high frequency angular velocity signal and a low frequency angular velocity signal to the first image shake correcting unit 107 and the second image shake correcting unit 111 can be performed with a simple configuration. Furthermore, the processing for changing the filter intermediate value of the HPF or LPF is performed upon switching. Thus, signals are smoothly switched upon changing the assignment of correction in the high frequency band and correction in the low frequency band to the first image shake correcting unit 107 and the second image shake correcting unit 111, so that favorable image shake correction performance can be realized.

(Fourth Embodiment)

Next, a description will be given of a fourth embodiment of the present invention. The configuration of the image shake correcting apparatus according to the present embodiment is as shown in the block diagram of FIG. 1 and the configuration of the frequency separating unit 103 is as shown in the block diagram of FIG. 8. However, in the present embodiment, the update of the filter intermediate value of the HPF or LPF described in the third embodiment is not performed. Hereinafter, a description will be given of the processing for switching the filter properties of the frequency separating unit 103 between HPF and LPF.

Figure 9A:
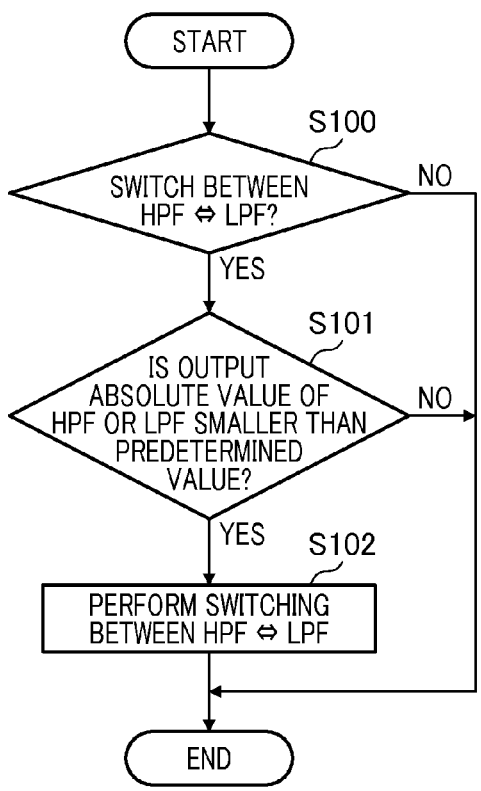
FIGS. 9A and 9B are flowcharts each illustrating processing performed by a frequency separation control unit according to the fourth embodiment of the present invention.

FIG. 9A is a flowchart illustrating the flow of processing by the frequency separation control unit 112. The processing is an example of processing performed when the filter properties of the frequency separating unit 103 is switched between HPF and LPF and is repeated at predetermined time intervals (e.g., ⅟60 sec).

In step S100, the frequency separation control unit 112 determines whether or not switching between the HPF 311H and the LPF 311L is performed with respect to the filter properties of the frequency separating unit 103. As has been described in the first embodiment, in the determination, the positive determination result (Yes) is obtained when the proportion of the magnitudes of the correctable amounts of the first image shake correcting unit 107 and the second image shake correcting unit 111 is reversed by changing the zooming magnification of the imaging apparatus. If it is determined in step S100 that a switching is made between the HPF 311H and the LPF 311L, the processing proceeds to step S101, whereas if the negative determination result (No) is obtained in step S100, the processing ends.

In step S101, an absolute value of the output of the HPF 311H or the output of the LPF 311L is compared with a predetermined value. The predetermined value is a threshold value for determination and is set to, for example, a near-zero level. The frequency separating unit 103 determines whether or not an absolute value of the output of the HPF 311H is less than a predetermined value in the case of the state shown in FIG. 8A whereas determines whether or not an absolute value of the output of the LPF 311L is less than a predetermined value in the case of the state shown in FIG. 8B. If it is determined in step S101 that an absolute value of the filter output is less than a threshold value, the processing proceeds to step S102, whereas if it is determined in step S101 that an absolute value of the filter output is equal to or greater than a threshold value, the processing ends.

Filter switching processing is performed in step S102. The LPF is switched to the HPF if the internal filter of the frequency separating unit 103 is the LPF or the HPF is switched to the LPF if the internal filter of the frequency separating unit 103 is the HPF, and then the processing ends.

In the example of processing shown in FIG. 9A, switching between HPF and LPF is performed after an absolute value of the output of the internal HPF or LPF of the frequency separating unit 103 is less than a threshold value in step S101. In other words, when the switching is immediately performed without determination processing in step S101, the drive speed of the first image shake correcting unit 107 and the second image shake correcting unit 111 largely changes upon switching as has been described in the third embodiment with reference to FIGS. 6A and 6B. Thus, the first image shake correcting unit 107 and the second image shake correcting unit 111 cannot follow a change in drive speed, so that a phenomenon may occur such that video is adversely affected by the following error at the time.

Figure 10A:
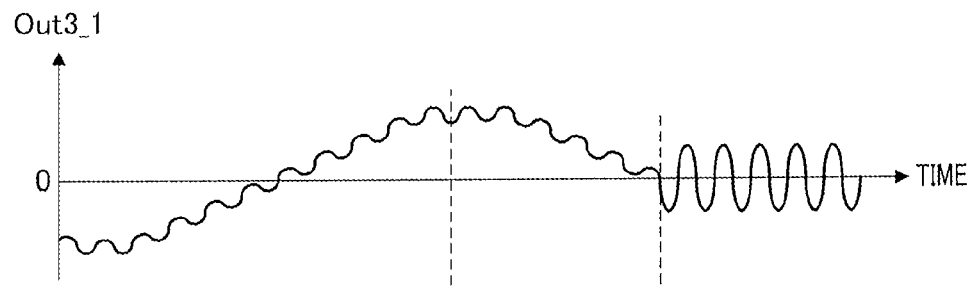
FIGS. 10A to 10D are graphs each illustrating the effect of control executed by a frequency separation control unit according to the fourth embodiment of the present invention.
Figure 10B:
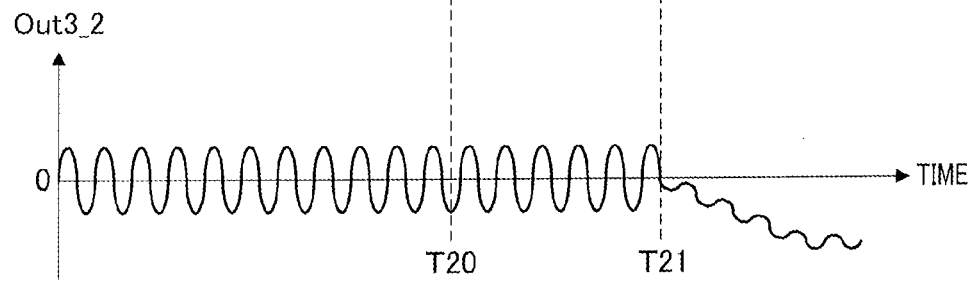

Hereinafter, a description will be given of the effect of processing shown in FIG. 9A with reference to FIGS. 10A and 10B. FIG. 10A shows a temporal change of the signal Out3_1 shown in FIG. 8, i.e., an input signal to the sensitivity computing unit 104, where time is plotted on the horizontal axis. FIG. 10B shows a temporal change of the signal Out3_2 shown in FIG. 8, i.e., an input signal to the sensitivity computing unit 108, where time is plotted on the horizontal axis. The frequency separating unit 103 is in the state shown in FIG. 8 in the period from time 0 to time T21. Time T20 indicates a point in time at which it is determined in step S100 shown in FIG. 9A that filter switching is performed. Time T21 indicates a point in time at which it is determined in step S101 shown in FIG. 9A that an absolute value of the filter output is less than a threshold value. After time T20, the state shown in FIG. 8B is held until time T21 but is switched to the state shown in FIG. 8A at time T21 when an absolute value of the output of the LPF 311L is less than a threshold value.

A discontinuity upon switching at time T10 as shown by the graphs in solid lines in FIGS. 6A and 6B does not occur at time T21, so that signals are smoothly interconnected. In this manner, as in the above embodiments, a phenomenon caused by an adverse effect of the following error of the first image shake correcting unit 107 and the second image shake correcting unit 111 on video can be prevented from being occurred.

Next, a description will be given of the processing shown in FIG. 9B as a variant example of the present embodiment. The difference from the processing shown in FIG. 9A is the processing in step S103. If it is determined in step S100 that switching between HPF and LPF is made for the filter provided in the frequency separating unit 103, the processing proceeds to step S103. In step S103, the frequency separation control unit 112 increases the cutoff frequency of the low frequency component attenuating unit 102, and then the processing proceeds to step S101.

A description will be given of the effect of processing shown in FIG. 9B with reference to FIGS. 10C and 10D. FIG. 10C shows a temporal change of the signal Out3_1 shown in FIG. 8, i.e., an input signal to the sensitivity computing unit 104, where time is plotted on the horizontal axis. FIG. 10D shows a temporal change of the signal Out3_2 shown in FIG. 8, i.e., an input signal to the sensitivity computing unit 108, where time is plotted on the horizontal axis. In FIGS. 10C and 10D, the frequency separating unit 103 is in the state shown in FIG. 8B in the period from time 0 to time T22. Time T20 is as described above, and time T22 indicates a point in time at which it is determined in step S101 shown in FIG. 9B that an absolute value of the filter output is less than a threshold value. In the period from time T20 to T22, control is performed to increase the cutoff frequency of the low frequency component attenuating unit 102. If the cutoff frequency of the low frequency component attenuating unit 102 increases, a low frequency component is attenuated from a signal input to the frequency separating unit 103. Thus, the output of the LPF 311L is converged to zero from time T20 to T22 as shown in FIG. 10C. As compared with FIG. 10A, it can be seen that the time from time T20 to time at which the processing in step S102 is performed is shortened.

Figure 9B:
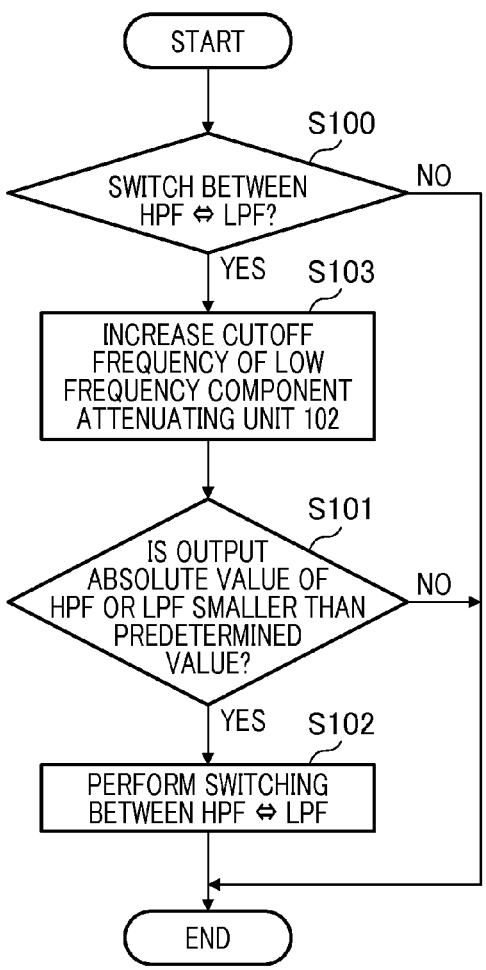
Figure 10C:
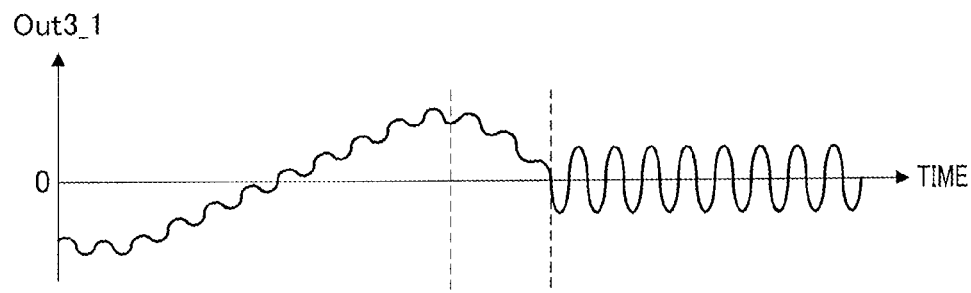
Figure 10D:
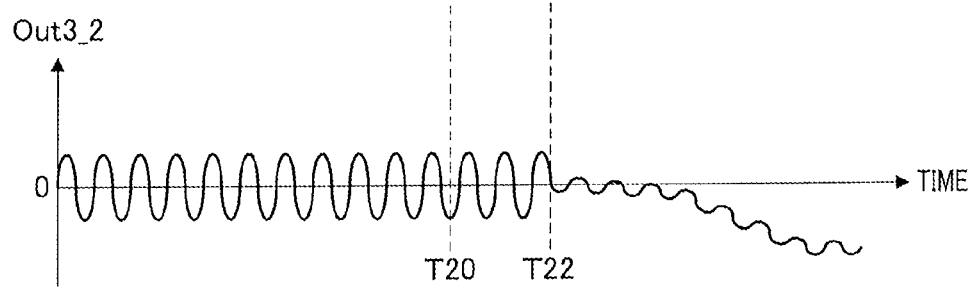

As described above, switching between LPF and HPF is performed by the processing shown in FIG. 9B when the output of an internal LPF or HPF of the frequency separating unit 103 is less than a predetermined value as in the case of FIG. 9A, so that signals are smoothly interconnected before and after the switching. In addition, the time required from time T20 at which it is determined to perform switching between LPF and HPF to time T22 at which filter switching is actually performed can be shortened.

In the present embodiment, upon switching the output destination of a high frequency angular velocity signal and a low frequency angular velocity signal to the first image shake correcting unit 107 and the second image shake correcting unit 111, the processing for switching the filter properties of the frequency separating unit 103 between HPF and LPF is performed. The timing is a point in time at which an absolute value of the output of HPF or LPF is less than a predetermined value. In this manner, signals are smoothly switched upon changing the assignment of correction in the high frequency band and correction in the low frequency band to the first image shake correcting unit 107 and the second image shake correcting unit 111, so that favorable image shake correction performance can be realized.

(Fifth Embodiment)

Next, a description will be given of a fifth embodiment of the present invention. The configuration of the image shake correcting apparatus according to the present embodiment is as shown in the block diagram of FIG. 7 and the configuration of the frequency separating unit 103 is as shown in the block diagram of FIG. 8. When referring to FIGS. 6A to 6D, it is assumed that "Out1_1 or Out2_1" is replaced with "Out3_1" and "Out1_2 or Out2_2" is replaced with "Out3_2" on the vertical axis.

The present embodiment is different from the third embodiment in that the integrating unit 121 (see FIG. 7) for converting speed information into angle information or positional information is provided at the front stage of the frequency separating unit 103. In the third embodiment, a description has been given that, for the discontinuity of signals at time T10 in the graphs in solid lines shown in FIGS. 6A and 6B, the drive speed relating to the first image shake correcting unit 107 and the second image shake correcting unit 111 abruptly changes. In the present embodiment, the sensitivity computing unit 104 and the sensitivity computing unit 108 multiply the output signals Out3_1 and Out3_2 shown in FIG. 8A or 8B by sensitivity. The results of multiplication are fed to the first image shake correcting unit 107 and the second image shake correcting unit 111 via the limiters 106 and 110, respectively. Thus, when an abrupt change as shown at time T10 occurs in the graphs in solid lines shown in FIGS. 6A and 6B, the first image shake correcting unit 107 and the second image shake correcting unit 111 are stepwisely driven. Consequently, video may be moved upon switching between a high frequency angle signal and a low frequency angle signal.

Accordingly, as in the third embodiment, in the present embodiment, the processing for rewriting the filter intermediate value as shown in (Formula 8) and (Formula 10) is performed upon switching between the internal LPF and HPF of the frequency separating unit 103. In this manner, as shown in FIGS. 6C and 6D, signals can be smoothly interconnected upon switching between a high frequency angle signal and a low frequency angle signal by the frequency separating unit 103. Thus, a phenomenon of visible movement of video can be prevented from being occurred by the stepwise driving of the first image shake correcting unit 107 and the second image shake correcting unit 111.

In the present embodiment, upon switching the filter properties of the frequency separating unit 103 between HPF and LPF in the image shake correcting apparatus in which the integrating unit is provided at the front stage of the frequency separating unit 103, the filter intermediate value of HPF or LPF is changed, and thus, a continuous signal can be obtained before and after the switching. Consequently, signals can be smoothly interconnected upon changing the assignment of correction in the high frequency band and correction in the low frequency band to the first image shake correcting unit 107 and the second image shake correcting unit 111, so that favorable image shake correction performance can be realized.

(Sixth Embodiment)

Figure 11:
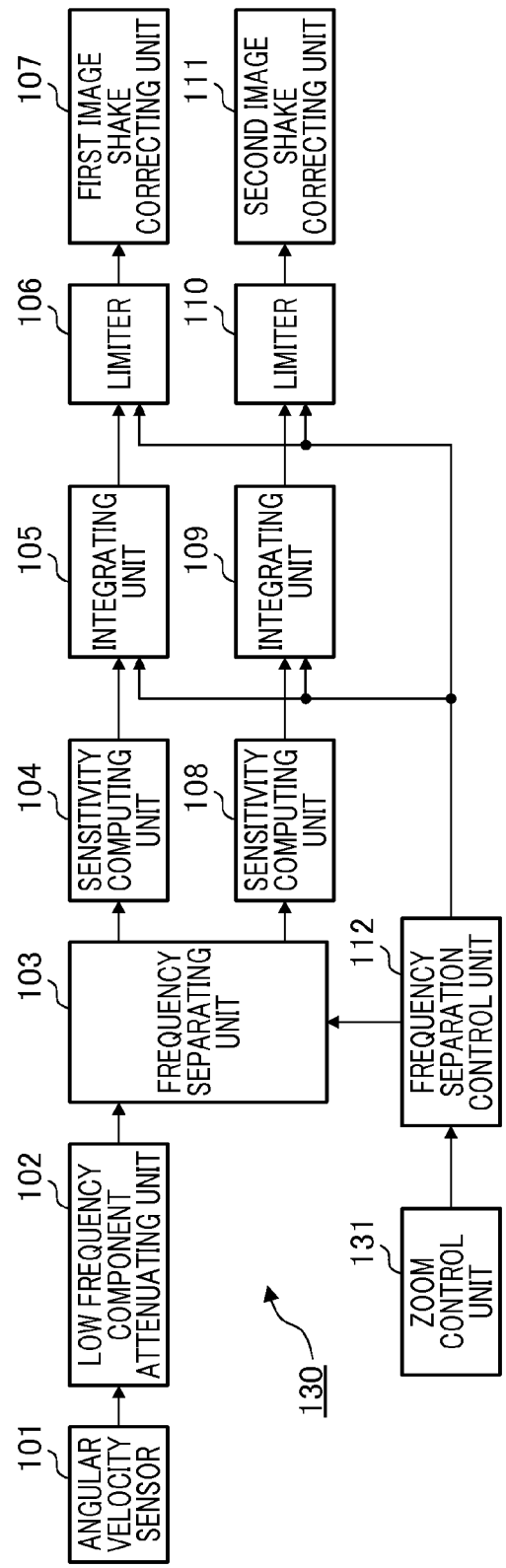
FIG. 11 is a block diagram illustrating an example of a configuration of an image shake correcting apparatus according to a sixth embodiment of the present invention.

Next, a description will be given of a sixth embodiment of the present invention. FIG. 11 is a block diagram illustrating an example of a configuration of an image shake correcting apparatus 130 according to the present embodiment. The differences between the configuration shown in FIG. 11 and that shown in FIG. 1 are as follows:

A zoom control unit 131 is additionally provided.

The frequency separation control unit 112 acquires information from the zoom control unit 131 to control the integrating units 105 and 109 or the limiters 106 and 110 or both.

In the present embodiment, a description will be given of the processing for switching the assignment of correction in the high frequency band and correction in the low frequency band to the first image shake correcting unit 107 and the second image shake correcting unit 111 when the imaging apparatus mounting the image shake correcting apparatus 130 is in the zooming operation.

The zoom control unit 131 determines whether or not the imaging apparatus mounting the image shake correcting apparatus 130 is in the zooming operation based on zoom lens position detection information. If the imaging apparatus is in the zooming operation as the result of determination, the zoom control unit 131 notifies the frequency separation control unit 112 of the fact that the imaging apparatus is in the zooming operation. The frequency separation control unit 112 controls the integrating units 105 and 109 and the limiters 106 and 110 in accordance with the notification.

FIG. 12A is a flowchart illustrating the flow of processing performed by the frequency separation control unit 112. The processing is repeated at predetermined time intervals (e.g., 1/60 sec).

In step S200, the frequency separation control unit 112 acquires information from the zoom control unit 131 to determine whether or not the imaging apparatus is in the zooming operation. If the frequency separation control unit 112 determines that the imaging apparatus is in the zooming operation based on position detection information or the like from the zoom control unit 131, the processing proceeds to step S201, whereas if the frequency separation control unit 112 determines that the imaging apparatus is not in the zooming operation, the processing shifts to step S204.

In step S201, the frequency separation control unit 112 shortens the time constant of one integrating unit, to which correction in the low frequency band is assigned, of the integrating units 105 and 109. The zoom operation member of the imaging apparatus is operated by the user or photographer during a zooming operation, resulting in a readily occurrence of shake in the low frequency band. Thus, if correction in the low frequency band is performed in the same manner as the state not in the zooming operation, it is highly probable that a correction member (e.g., correction lens) reaches its correctable limit. In order to prevent this, the processing for shortening the time constant of the integrating unit for calculating the correction amount in the low frequency band is executed during a zooming operation. Shortening the time constant has an effect for suppressing the correction effect by reducing the first correction amount or the second correction amount so as to make the correction as small as possible. Note that the processing for shortening the time constant of the integrating unit is not limited but other methods may also be employed. For example, any processing may be performed provided that the processing prevents the correction member from being reached to its correctable limit, such as the method for stopping correction in the low frequency band or the like. After the processing in step S201, the processing proceeds to step S202.

In step S202, it is determined whether or not switching between correction in the low frequency band and correction in the high frequency band to the first image shake correcting unit 107 and the second image shake correcting unit 111, i.e., frequency assignment switching is performed for the frequency separating unit 103. As has been described in the first embodiment with reference to FIG. 5, in the determination processing, the positive determination result (Yes) is obtained when the proportion of the magnitudes of the correctable amounts of the first image shake correcting unit 107 and the second image shake correcting unit 111 is reversed by changing the zooming magnification of the imaging apparatus. If it is determined in step S202 to perform frequency assignment switching, the processing proceeds to step S203, whereas if it is determined in step S202 not to perform frequency assignment switching, the processing ends. In step S203, the frequency separation control unit 112 sets a flag (CHANGE_FLAG) indicating whether or not switching between a high frequency band and a low frequency band is performed for the frequency separating unit 103, and the processing ends.

On the other hand, in step S204, the frequency separation control unit 112 determines whether or not the CHANGE_FLAG has been set. If no CHANGE_FLAG has been set in step S204, the processing ends. If the CHANGE_FLAG has been set in step S204, the processing proceeds to step S205, and the processing for switching between correction in the low frequency band and correction in the high frequency band to the first image shake correcting unit 107 and the second image shake correcting unit 111 is executed. After step S205, the processing proceeds to step S206, and the CHANGE_FLAG is reset. Then, the processing ends.

Next, a description will be given of the effect of processing shown in FIG. 12A with reference to FIG. 13. Each of FIGS. 13A and 13C shows a temporal change of the output signal of the integrating unit 105, where time is plotted on the horizontal axis. Each of FIGS. 13B and 13D shows a temporal change of the output signal of the integrating unit 109, where time is plotted on the horizontal axis. It is assumed in FIGS. 13A to 13D that the zooming operation of the imaging apparatus is performed in the period from time T30 to time T32 but is not performed in other periods.

FIGS. 13A and 13B show the change in outputs of the integrating units 105 and 109 when the processing described with reference to FIG. 12A is not performed. A description will be given of the case where the first image shake correcting unit 107 performs correction in the low frequency band in the period from time 0 to time T31 but performs correction in the high frequency band after time T31. When the zooming operation starts at time T30, the processing for shortening the time constant of the integrating unit 105 for calculating the correction amount in the low frequency band less than a set value is executed. Thus, the output of the integrating unit 105 is converged to zero from time T30 to time T31. Time T31 indicates a timing at which the proportion of the magnitudes of the correctable amounts of the first image shake correcting unit 107 and the second image shake correcting unit 111 is reversed. In other words, assignment of correction in the low frequency band and correction in the high frequency band is switched at time T31. After time T31, correction in the low frequency band is performed by the second image shake correcting unit 111. Thus, the processing for returning the time constant of the integrating unit 105 back to its original set value to shorten the time constant of the integrating unit 109 is executed. In this manner, the output of the integrating unit 109 is converged to zero from time T31 to time T32. Then, upon completion of the zooming operation at time T32, the processing for returning the time constant of the integrating unit 109 back to its original set value is performed, and image shake correction in a low frequency band is performed by the second image shake correcting unit 111.

If the processing shown in FIG. 12A is not performed, the image shake correcting unit that performs correction in the low frequency band immediately after start of the zooming operation is controlled to return to the central position of the correctable range thereof. Immediately after switching between correction in the low frequency band and correction in the high frequency band during the subsequent zooming operation, the image shake correcting unit that newly performs correction in the low frequency band is controlled to return to the central position of the correctable range thereof. In this case, if unintended movement of an image for the user or photographer occurs in plural times during a zooming operation, an unnatural impression may be given of the user or photographer.

In contrast, FIGS. 13C and 13D show the change in signal outputs of the integrating units 105 and 109 when the processing described with reference to FIG. 12A is performed. In FIGS. 13C and 13D, time T31 indicates a timing at which assignment of correction in the low frequency band and correction in the high frequency band is switched. However, no frequency assignment switching is performed during a zooming operation by the processing in steps S202 and S203 shown in FIG. 12A. At time T32 upon completion of the zooming operation, frequency assignment to the first image shake correcting unit 107 and the second image shake correcting unit 111 is switched by the processing in step S205.

In the processing shown in FIG. 12A, no frequency assignment switching is performed during a zooming operation but is performed after completion of the zooming operation, the occurrence of unintended movement of an image for the user or photographer can be limited only at a timing immediately after completion of the zooming operation. Thus, an unnatural impression caused by movement of an image in plural times can be avoided from being given to the user or photographer.

In the present embodiment, the output destination of a high frequency angular velocity signal and a low frequency angular velocity signal to the first image shake correcting unit 107 and the second image shake correcting unit 111 is switched after completion of the zooming operation. More specifically, a change to a first control or a second control is prohibited during a zooming operation but is performed after completion of the zoom position change operation. Thus, signals are smoothly switched upon changing the assignment of correction in the high frequency band and correction in the low frequency band to the first image shake correcting unit 107 and the second image shake correcting unit 111, so that favorable image shake correction performance can be realized.

Next, a description will be given of a variant example of the present embodiment with reference to FIGS. 12B and 14. In the variant example, the frequency separation control unit 112 controls the integrating units 105 and 109 and the limiters 106 and 110.

Figure 12B:
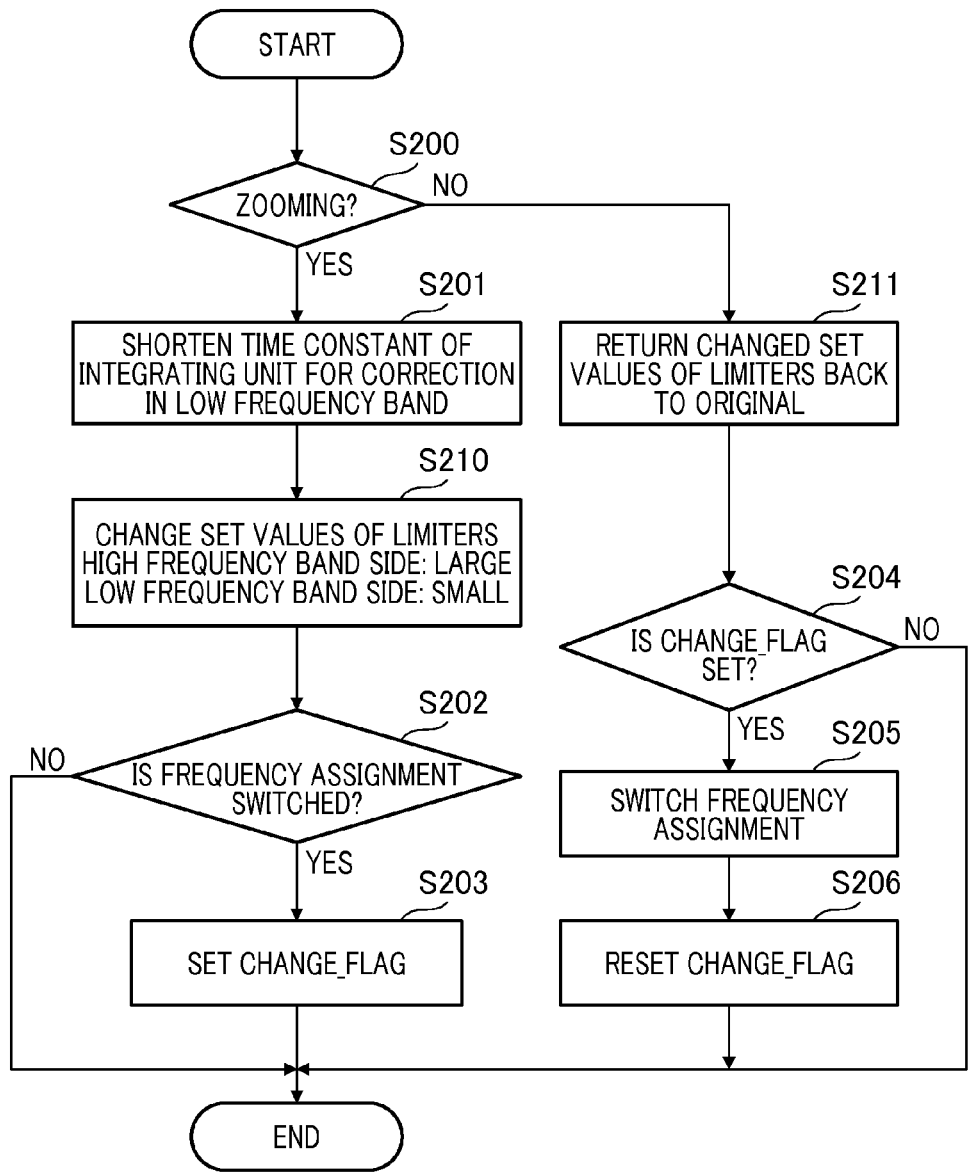
Figure 13A:
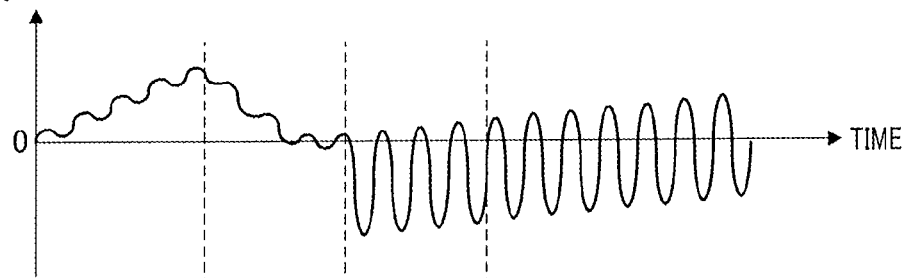
FIGS. 13A to 13D are graphs each illustrating the effect of control executed by a frequency separation control unit according to the sixth embodiment of the present invention.
Figure 13B:
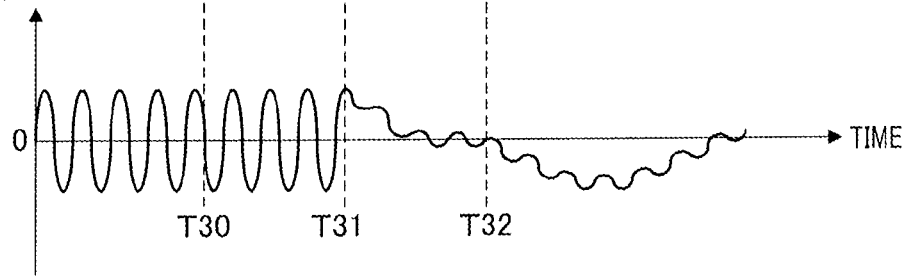
Figure 13C:
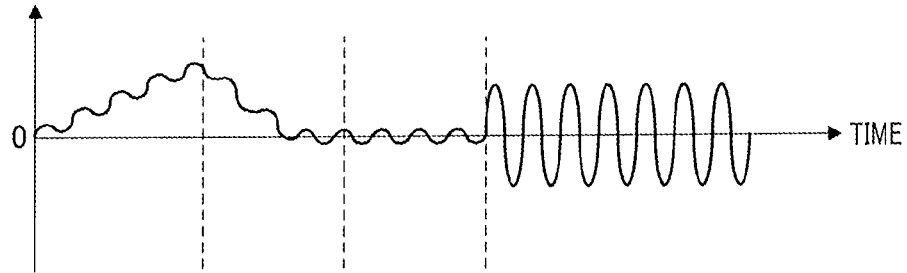
Figure 13D:
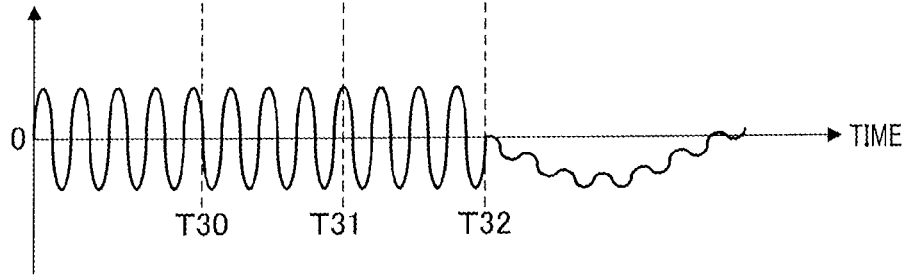

FIG. 12B is a flowchart illustrating the flow of processing performed by the frequency separation control unit 112. A description will be given mainly of the additional processing in steps S210 and S211 as compared with that shown in FIG. 12A.

If it is determined in step S200 that the imaging apparatus is in the zooming operation, the processing proceeds to step S210 after step S201. In step S210, the frequency separation control unit 112 changes the set values (upper limits) of the limiters 106 and 110. As compared with the set values of the limiters predetermined for each zoom position, the set value of one limiter for correction in the high frequency band is changed to a large value and the set value of the other limiter for correction in the low frequency band is changed to a small value.

If it is determined in step S200 that the imaging apparatus is not in the zooming operation, the processing proceeds to step S211. If the set values of the limiters 106 and 110 which are in the zooming operation have been changed by the processing in step S210, the processing for returning the set values of the limiters 106 and 110 back to their original set values predetermined for each zoom position is performed in step S211. After step S211, the processing proceeds to step S204.

Figure 14A:
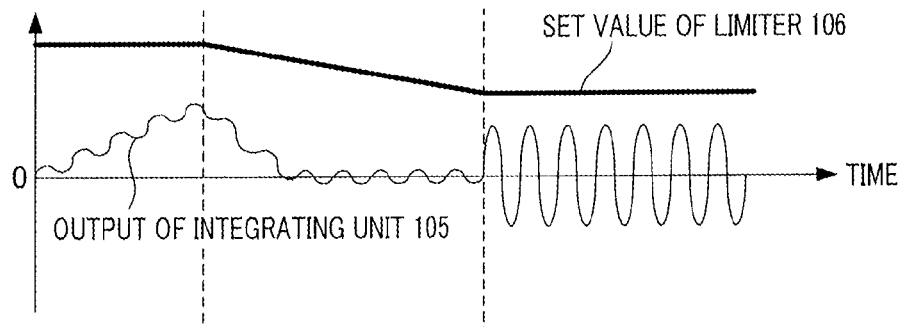
FIGS. 14A to 14D are graphs each illustrating the effect of control executed by a frequency separation control unit according to a variant example of the sixth embodiment of the present invention.
Figure 14B:
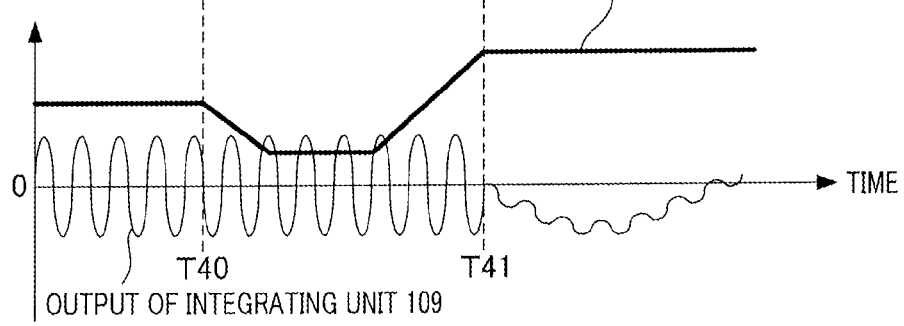
Figure 14C:
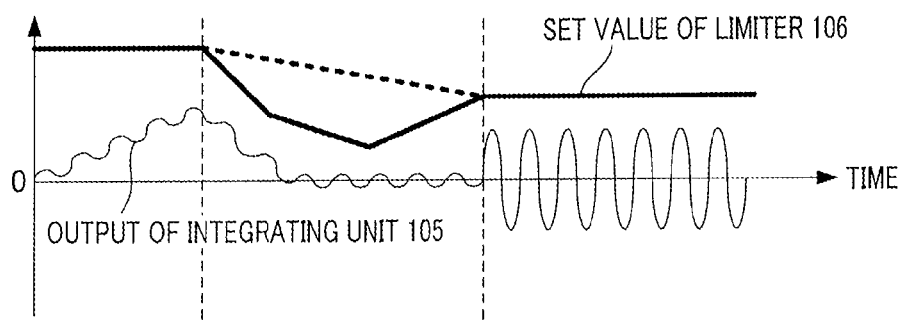
Figure 14D:
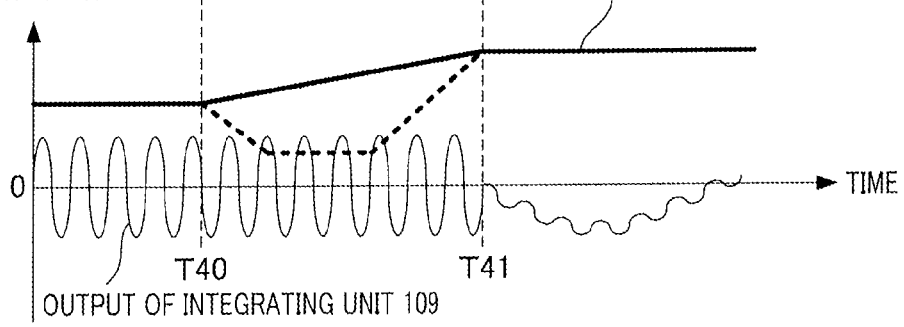

Next, a description will be given of the effect of processing shown in FIG. 12B with reference to FIG. 14. Each of FIGS. 14A and 14C shows temporal changes of the output signal (thin line) of the integrating unit 105 and the set value (thick line) of the limiter 106, where time is plotted on the horizontal axis. Each of FIGS. 14B and 14D shows temporal changes of the output signal (thin line) of the integrating unit 109 and the set value (thick line) of the limiter 110, where time is plotted on the horizontal axis. It is assumed in FIGS. 14A to 14D that the zooming operation of the imaging apparatus is performed in the period from time T40 to time T41 but is not performed in other periods. The first image shake correcting unit 107 performs correction in the low frequency band and the second image shake correcting unit 111 performs correction in the high frequency band in the period from time 0 to time T41 and frequency assignment is switched at time T41.

Each of FIGS. 14A and 14B shows the change in the outputs of the integrating units 105 and 109 and the set values of the limiters 106 and 110 when the processing shown in FIG. 12B is not performed. As shown in FIG. 14B, the correctable range of the second image shake correcting unit 111 that performs correction in the high frequency band, i.e., the set value of the limiter 110 becomes temporarily small during a zooming operation in the period from time 0 to time T41. Then, the set value of the limiter 110 is increased. In this example, when the set value of the limiter 110 becomes small, the output of the integrating unit 109 becomes greater than the set value of the limiter 110. Thus, correction in the high frequency band may not be correctly performed.

In contrast, each of FIGS. 14C and 14D shows the change in the set values of the limiters 106 and 110 when the processing shown in FIG. 12B is performed. The graphs shown by thick solid lines indicate temporal changes of the set values of the limiters 106 and 110. The graphs shown by dotted lines indicate the change in the set values of the limiters 106 and 110 predetermined for each zoom position. By the processing in step S210 shown in FIG. 12B, the set values of the limiters 106 and 110 vary as shown in the graphs shown by solid lines.

From time T40, the output of the integrating unit 105, which is the correction target position of the first image shake correcting unit 107 for performing correction in the low frequency band, is converged toward zero as shown by the graph shown by the thin solid line shown in FIG. 14C. Thus, even when the set value of the limiter 106 is less than a set value predetermined for each zoom position by the processing in step S210 as shown by the graph shown by the thick solid line shown in FIG. 14C, no change occurs in the output of the integrating unit 105. On the other hand, the set value of the limiter 110 can be increased by the amount of reduction in the set value of the limiter 106. In other words, the set value of the limiter 110 is changed to be larger than a set value predetermined for each zoom position by the processing in step S210 during a zooming operation (in the period from time T40 to T41) as shown by the graph shown by the thick solid line shown in FIG. 14D. Thus, the output of the integrating unit 109 is prevented from being larger than the set value of the limiter 110 as has been described with reference to FIG. 14B, so that correction in the high frequency band can be correctly performed.

In a variant example of the sixth embodiment, control is made during a zooming operation such that the set value of the limiter of the image shake correcting unit for performing correction in the low frequency band is set to be small and the set value of the limiter of the image shake correcting unit for performing correction in the high frequency band is set to be large. In this manner, when the correctable range predetermined for each zoom position becomes small during a zooming operation, the image shake correcting unit for performing correction in the high frequency band can be avoided from being reached to its correctable limit.

As described above, while a detailed description has been given based on preferred embodiments of the present invention, the present invention is not limited to these specific embodiments but the various embodiments without departing from the spirit of the present invention may also be included in the technical scope of the present invention. A part of the above embodiments may also be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-006224, filed on Jan. 16, 2014, which is hereby incorporated by reference herein in its entirety.

What is claimed is:

1. An image shake correcting apparatus that corrects image shake using a first image shake correcting unit and a second image shake correcting unit, the image shake correcting apparatus comprising:
   a signal separating unit configured to separate a shake signal detected by a shake detecting unit into a low frequency signal and a high frequency signal; and
   a control unit configured to perform a switching operation between a first control which corrects image shake by controlling the first image shake correcting unit using a shake correction signal calculated from the low frequency signal without the high frequency signal and corrects image shake by controlling the second image shake correcting unit using a shake correction signal calculated from the high frequency signal without the low frequency signal and a second control which corrects image shake by controlling the first image shake correcting unit using the shake correction signal calculated from the high frequency signal without the low frequency signal and corrects image shake by controlling the second image shake correcting unit using the shake correction signal calculated from the low frequency signal without the high frequency signal,
   wherein the control unit performs the first control if the size of the correctable range of the first image shake correcting unit is larger than the size of the correctable range of the second image shake correcting unit but performs the second control if the size of the correctable range of the second image shake correcting unit is larger than the size of the correctable range of the first image shake correcting unit.

2. The image shake correcting apparatus according to claim 1, wherein the control unit sets the cut-off frequency of a high-pass filter to be greater than a predetermined value during a zoom position change operation so as to reduce a shake correction amount calculated from the low frequency signal.

3. The image shake correcting apparatus according to claim 1, wherein the relationship between the size of the correctable range of the first image shake correcting unit and the size of the correctable range of the second image shake correcting unit is reversed depending on a zooming magnification.

4. The image shake correcting apparatus according to claim 3, wherein the control unit prohibits the switching operation during a zoom position change operation but performs the itching operation after completion of the zoom position change operation.

5. The image shake correcting apparatus according to claim 3, wherein the control unit stops an image shake correction using the shake correction signal calculated from the low frequency signal during a zoom position change operation so as to provide centering of an image shake correcting unit controlled by using the shake correction signal calculated from the low frequency signal and to extend a limiter for determining the upper limit of the shake correction signal calculated from the high frequency signal.

6. An image shake correcting apparatus that corrects image shake using a first image shake correcting unit and a second image shake correcting unit, the image shake correcting apparatus comprising:

a signal separating unit configured to separate a shake signal detected by a shake detecting unit into a low frequency signal and a high frequency signal; and a control unit configured to perform a switching operation between a first control which corrects image shake by controlling the first image shake correcting unit using a shake correction signal calculated from the low frequency signal without the high frequency signal and corrects image shake by controlling the second image shake correcting unit using a shake correction signal calculated from the high frequency signal without the low frequency signal and a second control which corrects image shake by controlling the first image shake correcting unit using the shake correction signal calculated from the high frequency signal without the low frequency signal and corrects image shake by controlling the second image shake correcting unit using the shake correction signal calculated from the low frequency signal without the high frequency signal, wherein the control unit prohibits the switching operation during a zoom position change operation but performs the switching operation after completion of the zoom position change operation.

7. An image shake correcting apparatus that corrects image shake using a first image shake correcting unit and a second image shake correcting unit, the image shake correcting apparatus comprising:

a signal separating unit configured to separate a shake signal detected by a shake detecting unit into a low frequency signal and a high frequency signal; and a control unit configured to perform a switching operation as to whether a first correcting unit corrects image shake based on the low frequency signal without the high frequency signal and a second correcting unit corrects image shake based on the high frequency signal without the low frequency signal or the first correcting unit corrects image shake based on the high frequency signal without the low frequency signal and the second correcting unit corrects image shake based on the low frequency signal without the high frequency signal depending on the relationship, which varies with a zooming magnification, between the size of the correctable range of the first image shake correcting unit and the size of the correctable range of the second image shake correcting unit.

8. A control method to be executed by an image shake correcting apparatus that corrects image shake using a first image shake correcting unit and a second image shake correcting unit, the method comprising:

separating a shake signal detected by a shake detecting unit into a low frequency signal and a high frequency signal; and controlling a switching operation between a first control which corrects image shake by controlling the first image shake correcting unit using a shake correction signal calculated from the low frequency signal without the high frequency signal and corrects image shake by controlling the second image shake correcting unit using a shake correction signal calculated from the high frequency signal without the low frequency signal and a second control which corrects image shake by controlling the first image shake correcting unit using the shake correction signal calculated from the high frequency signal without the low frequency signal and corrects image shake by controlling the second image shake correcting unit using the shake correction signal calculated from the low frequency signal without the high frequency signal, wherein the first control is performed in the controlling if the size of the correctable range of the first image shake correcting unit is larger than the size of the correctable range of the second image shake correcting unit whereas the second control performed in the controlling if the size of the correctable range of the second image shake correcting unit is larger than the size of the correctable range of the first image shake correcting unit.

9. A control method to be executed by an image shake correcting apparatus that corrects image shake using a first image shake correcting unit and a second image shake correcting unit, the method comprising:

separating a shake signal detected by a shake detecting unit into a low frequency signal and a high frequency signal; and controlling a switching operation between a first control which corrects image shake by controlling the first image shake correcting unit using a shake correction signal calculated from the low frequency signal without the low frequency signal and corrects image shake by controlling the second image shake correcting unit using a shake correction signal calculated from the high frequency signal without the low frequency signal, and a second control which corrects image shake by controlling the first image shake correcting unit using the shake correction signal calculated from the high frequency signal without the low frequency signal and corrects image shake by controlling the second image shake correcting unit using the shake correction signal calculated from the low frequency signal without the high frequency signal, wherein the switching operation is prohibited in the controlling during a zoom position change operation but the switching operation is performed in the controlling after completion of the zoom position change operation.

10. A control method to be executed by an image shake correcting apparatus that corrects image shake using a first image shake correcting unit and a second image shake correcting unit, the method comprising:

separating a shake signal detected by a shake detecting unit into a low frequency signal and a high frequency signal; and controlling a switching operation as to whether a first correcting unit corrects image shake based on the low frequency signal without the high frequency signal and a second correcting unit corrects image shake based on the high frequency signal without the low frequency signal or the first correcting unit corrects image shake based on the high frequency signal without the low frequency signal and the second correcting unit corrects image shake based on the low frequency signal without the high frequency signal depending on the relationship, which varies with a zooming magnification, between the size of the correctable range of the first image shake correcting unit and the size of the correctable range of the second image shake correcting unit.

* * * * *